United States Patent
Lo et al.

(10) Patent No.: US 7,864,732 B2
(45) Date of Patent: Jan. 4, 2011

(54) SYSTEMS AND METHODS FOR HANDOFF IN WIRELESS NETWORK

(75) Inventors: Pang Hsiang Lo, Taipei (TW); Shiao-Li Tsao, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 787 days.

(21) Appl. No.: 11/616,448

(22) Filed: Dec. 27, 2006

(65) Prior Publication Data

US 2007/0177549 A1  Aug. 2, 2007

Related U.S. Application Data

(60) Provisional application No. 60/763,062, filed on Jan. 27, 2006, provisional application No. 60/826,388, filed on Sep. 21, 2006.

(51) Int. Cl.
*H04W 4/00* (2009.01)
(52) U.S. Cl. .................... 370/331; 455/436; 455/437; 455/438; 455/439
(58) Field of Classification Search ............... 455/411, 455/436–442; 370/331
See application file for complete search history.

(56) References Cited

U.S. PATENT DOCUMENTS

| | | | | |
|---|---|---|---|---|
| 5,896,368 | A * | 4/1999 | Dahlman et al. | 370/335 |
| 2003/0185233 | A1 | 10/2003 | Ji | |
| 2003/0224775 | A1 | 12/2003 | Suda | |
| 2004/0218580 | A1 | 11/2004 | Bahl et al. | |
| 2004/0240412 | A1 * | 12/2004 | Winget | 370/331 |
| 2004/0242228 | A1 | 12/2004 | Lee et al. | |
| 2005/0163078 | A1 | 7/2005 | Oba et al. | |
| 2005/0237962 | A1 | 10/2005 | Upp et al. | |
| 2006/0062183 | A1 * | 3/2006 | Forte et al. | 370/331 |
| 2006/0079232 | A1 * | 4/2006 | Omori et al. | 455/436 |
| 2006/0182104 | A1 * | 8/2006 | Lee et al. | 370/389 |

(Continued)

FOREIGN PATENT DOCUMENTS

JP  2000509573  7/2000

(Continued)

OTHER PUBLICATIONS

U.S. Appl. No. 60/685,153 (Huang et al.) Method and Apparatus for WIFI Terminal with Dual MAC Structure that Enables Seamless Voice Communications Handover. May 27, 2005.*

(Continued)

*Primary Examiner*—Wayne Cai
(74) *Attorney, Agent, or Firm*—Thomas, Kayden, Horstemeyer & Risley

(57) ABSTRACT

Methods performed by a mobile node (MN) in a secured network for handoff of communication from a serving access point (AP) to a target AP are provided. In a bounded delay channel switching (BDCS) method, the MN periodically switches between a first channel and one of multiple other channels during handoff, utilizes the first channel to transmit/receive packets to/from a corresponding node (CN) via the serving AP and utilizes one of the other channels to perform the handoff procedure to the target AP. In a dual-MAC switching (DMS) method, the MN employs a first MAC (medium access control) address to transmit/receive packets to/from the serving AP and a second MAC address to perform the handoff procedure to the target AP.

44 Claims, 28 Drawing Sheets

U.S. PATENT DOCUMENTS

2007/0047490 A1* 3/2007 Haverinen et al. .......... 370/331

FOREIGN PATENT DOCUMENTS

| JP | 2004304280 A | 10/2004 |
|---|---|---|
| JP | 2005295186 | 10/2005 |
| JP | 2005323034 | 11/2005 |
| JP | 2006005630 | 1/2006 |
| WO | 2004107671 A1 | 12/2004 |
| WO | WO 2005083950 | 9/2005 |

OTHER PUBLICATIONS

English abstract of JP2006005630.
English abstract of JP2000509573.
English language abstract of JP 2004304280 (Oct. 28, 2004).
English language abstract of WO 2004107671 (Dec. 9, 2004).
English language translation of abstract of WO 2005083950 (published Sep. 9, 2005).
English language translation of abstract of JP 2005295186 (published Oct. 20, 2005).
English language translation of abstract JP 2005323034 (published Nov. 17, 2005).

* cited by examiner

SYSTEMS AND METHODS FOR HANDOFF IN WIRELESS NETWORK

CROSS-REFERENCE TO RELATED APPLICATIONS

The present application claims the benefit of U.S. provisional applications entitled "SYSTEM AND METHOD FOR SMOOTH HANDOFF MECHANISMS IN A WIRELESS RSN USING MULTIPLE MAC APPROACH", Ser. No. 60/763,062, filed Jan. 27, 2006, and entitled "SYSTEM AND METHOD OF SMOOTH HAND-OFF MECHANISMS IN A WIRELESS RSN USING MULTIPLE MAC APPROACH", Ser. No. 60/826,388, filed Sep. 21, 2006.

BACKGROUND

The invention relates to wireless LAN (local area network), and more particularly, to systems and methods for smooth handoff in secured wireless LANs.

In a wireless LAN, a mobile node (MN) associates with an access point (AP) and exchanges data and voice packets with a corresponding node (CN) via the associated AP. When the MN is moving out of range from one AP and can get a better radio link from another AP, a handoff procedure is performed to transfer an ongoing call or data session from the associated AP to the other AP (referred to as the target AP). The handoff procedure requires time to perform authentication, authorization and assignment of data encryption key for the target AP. As a result, some packets including data and voice packets may be lost during the handoff procedure, reducing the quality of data or voice transmission.

SUMMARY OF THE INVENTION

Methods for handoff in a secured network, performed by a mobile node (MN), are provided. According to an embodiment of the present invention, a method for handoff in a secured network comprises the following steps. Channels are periodically switched between a first channel and one of multiple other channels during handoff to utilize the first channel to transmit/receive multiple packets to/from a corresponding node (CN) via a serving access point (AP) which the MN has associated with and utilize one of the other channels to perform a handoff procedure to a target AP which is to be associated with the MN. The first channel is switched to in multiple duty cycles of packet intervals and the other channels are switched to in multiple sleep cycles of packet intervals, where the duty cycles and the sleep cycles are interleaved.

According to another embodiment of the present invention, a method for handoff in a secured network comprises the following steps. The MN is associated with a serving access point (AP) to transmit/receive multiple packets to/from a corresponding node (CN) using a first MAC (medium access control) address. The MN performs a handoff procedure to a target AP by employing a second MAC address. Once the handoff procedure is completed, the mobile node transmits/receives packets to/from the CN via the target AP.

Systems for handoff in a secured network, resident on an MN, are provided. According to an embodiment of the present invention, a system for smooth handoff in a secured network comprises a communication unit and a processor coupled to the communication unit. The processor periodically directs the communication unit to switch channels between a first channel and one of a plurality of other channels during handoff to utilize the first channel to transmit/receive multiple packets to/from a CN via a serving AP which the MN has associated with and utilize one of the other channels to perform the handoff procedure to a target AP which is to be associated with the MN. The first channel is switched to in multiple duty cycles of packet intervals and the other channels are switched to in multiple sleep cycles of packet intervals, where the duty cycles and the sleep cycles are interleaved.

According to another embodiment of the present invention, a system for smooth handoff in a secured network comprises a communication unit and a processor coupled to the communication unit. The processor associates with a serving AP to transmit/receive multiple packets to/from a CN via the communication unit using a first MAC address, and performs a handoff procedure to a target AP by employing a second MAC address. Once the handoff procedure is completed, the mobile node transmits/receives packets to/from the CN via the target AP.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENTS

Figure 1A:
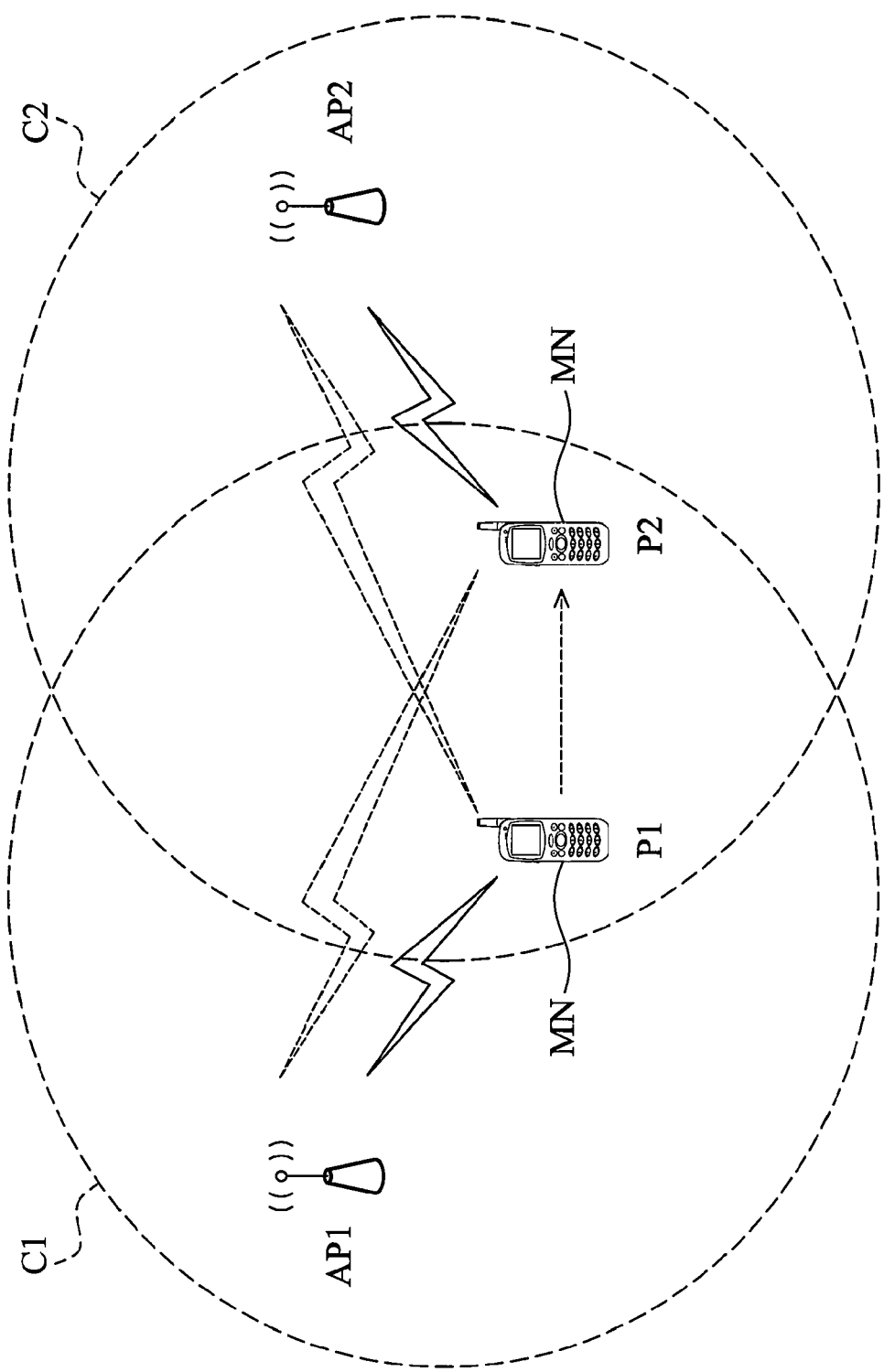
FIG. 1a, is a diagram of a mobile node being moved in an overlapping area between two cells respectively managed by two access points.
Figure 1B:
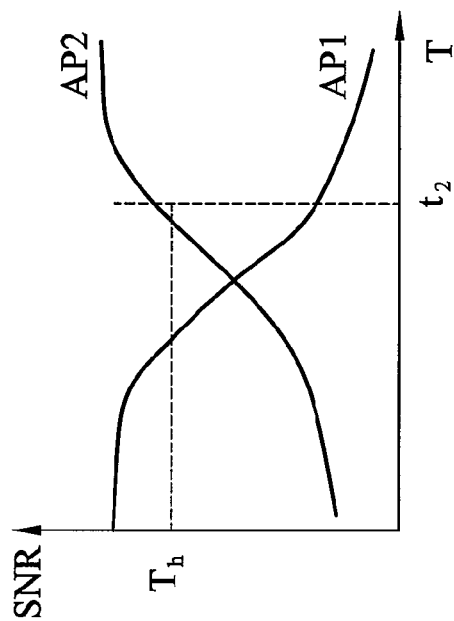
FIG. 1b, is a diagram illustrating signal strength variation during the movement of the mobile node.
Figure 1B:
Figure 1B:
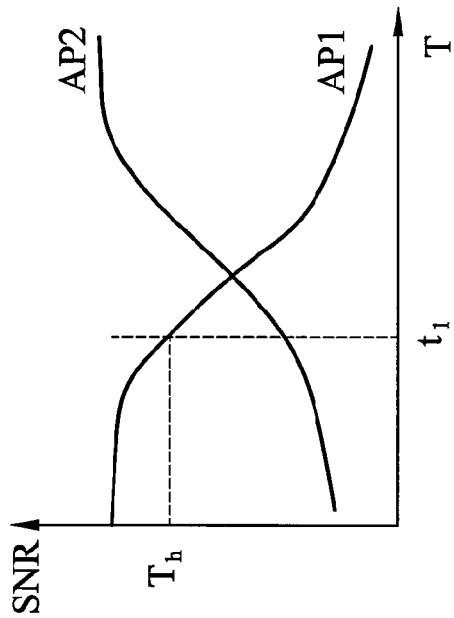

FIG. 1a, is a diagram of a mobile node MN, such as a mobile phone, a notebook computer, a personal digital assistant (PDA) or the like, being moved in an overlapping area between cells C1 and C2 respectively managed by access points AP1 and AP2. FIG. 1b, is a diagram of signal strength variation during the movement of the mobile node MN shown in FIG. 1a. During the movement when the mobile node MN is carried to a region closer to the access point AP2 than the access point AP1 (for example, carried from location P1 at time t1 to location P2 at time t2), a strength of a signal from AP1 decreases, and conversely, a strength of a signal from AP2 increases. The signal strength is typically measured in the form of signal-to-noise ratio (SNR) by the mobile node MN. A handoff procedure is activated to transfer an ongoing call or a communication session from AP1 to AP2 while, for example, the signal strength of the signal from AP1 is lower than a pre-defined threshold $T_h$. AP1, also called a serving AP, is the AP that the MN is currently associated with. AP2, also called a target AP, is the AP which the MN will be associated with via a handoff. The handoff procedure typically comprises a channel scan to find an AP with the maximum signal strength (the target AP), an open system authentication, and an association with the target AP.

Figure 2A:
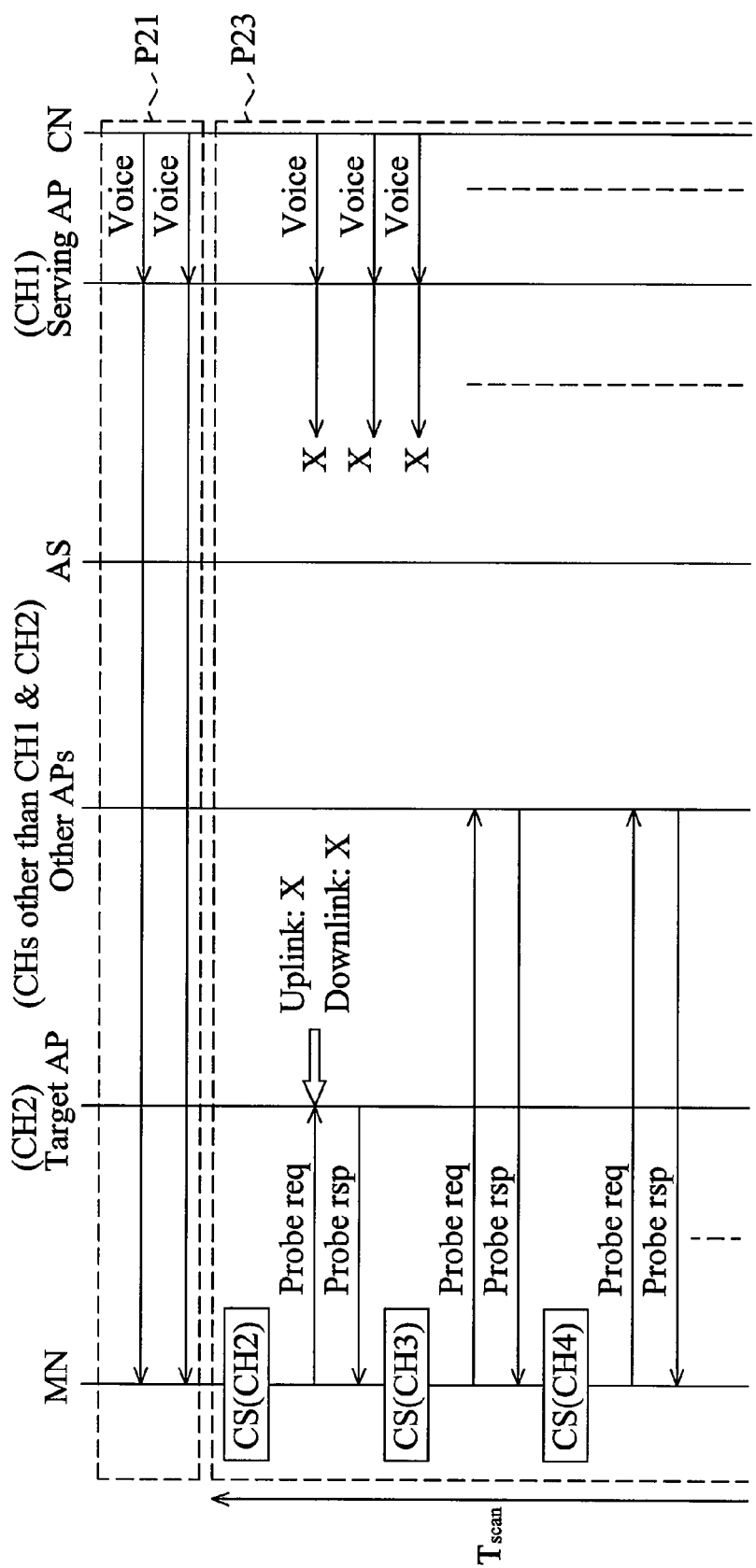
FIG. 2 is a sequence diagram illustrating an exemplary IEEE 802.1x handoff procedure using EAP-MD5 (extensible authentication protocol-message digest 5)
Figure 2B:
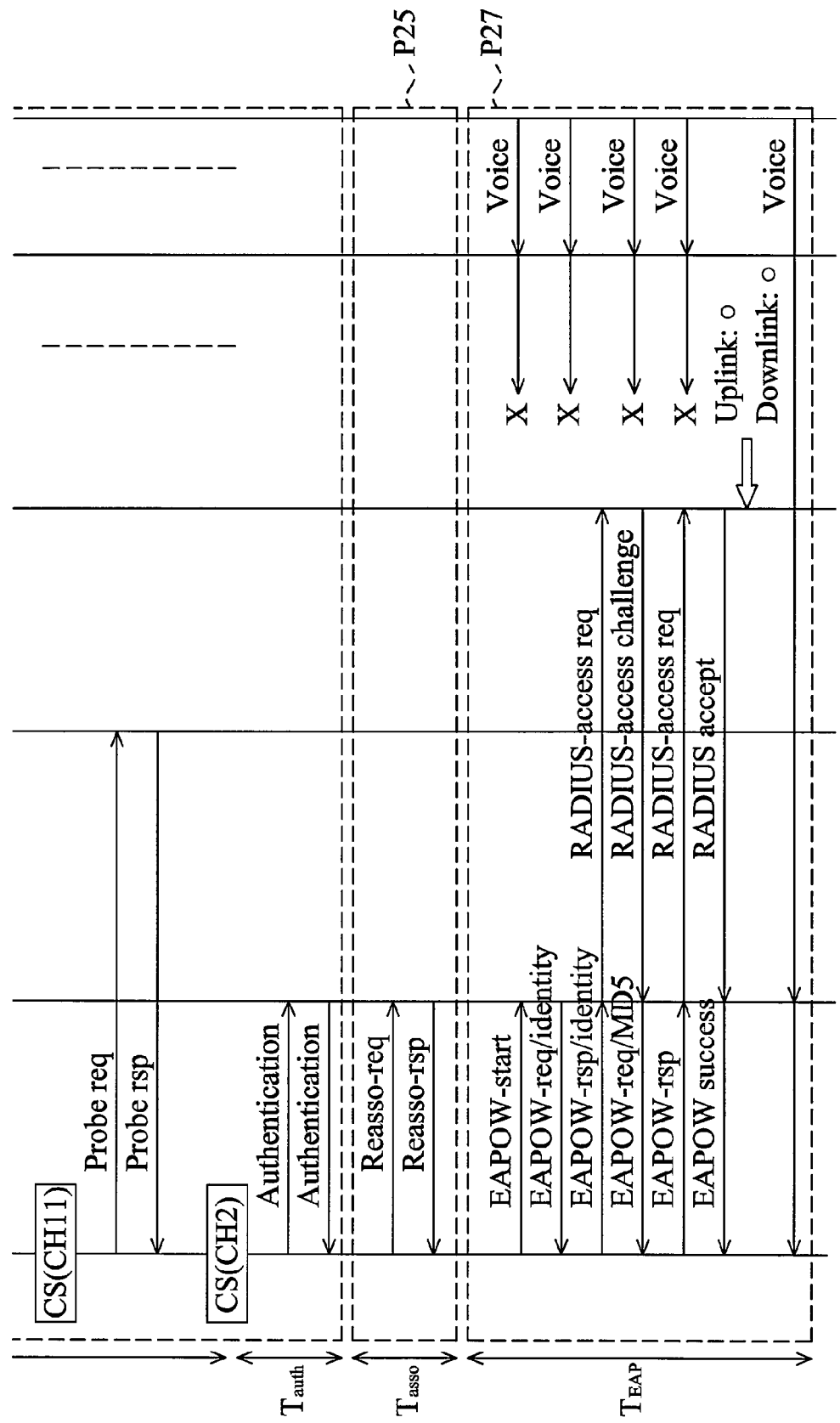

FIG. 2 is a sequence diagram illustrating an exemplary handoff procedure based on IEEE 802.1x and EAP-MD5 (extensible authentication protocol-message digest 5). This is not prior art for purposes of determining the patentability of the invention and merely shows problems found by the present inventors. The entire sequence may be divided into four stages, including data transfer P21, scan and authentication P23, re-association P25 and EAP authentication P27. In the data transfer stage P21, when an MN detects that received signals from a serving AP are not strong enough, it activates a handoff procedure with IEEE 802.1x enabled. During the data transfer stage P21, packets, such as data, VoIP (voice over IP) or other packets, are transmitted/received to/from a corresponding node (CN). The next AP to be associated with is discovered and authenticated in the scan and authentication stage P23. Specifically, using an active scan approach, the MN sequentially switches to channels other than a channel utilized to communicate with the serving AP, sends probe requests via the other channels and receives probe responses via the other channels, and determines the next AP to be associated with (the target AP) according to signal strengths of the received probe responses. After determining the target AP, the MN sends messages to the target AP to initiate the authentication process. It is to be understood that, when the MN switches to other channels to perform the active scan, no data or voice packet can be transmitted/received to/from the CN via the currently associated AP, resulting in packet delay and loss. In the re-association stage P25, after the MN is successfully authenticated by the target AP, the MN establishes a link-layer connection to the target AP (the process is also called a re-association process). Although the MN establishes a link-layer connection with the target AP in the re-association stage P25, the MN still cannot receive/transmit packets from/to the CN via the target AP because the MN is not authenticated by using IEEE 802.1x yet. In the EAP authentication stage P27, the MN and an authentication server (referred to as the AS, which is an entity that provides authentication services for the authenticator) authenticate each other by EAPOW (extensible authentication protocol over wireless). After the AS authenticates the MN, the AS transmits a data packet comprising "RADIUS-Access Accept" message to the target AP to notify it that the MN is successfully authenticated. Subsequently, the target AP activates an authorized port, and transmits a data packet comprising "EAPOW success" message to the MN to notify it that the MN is successfully authenticated. At this point, the handoff is completed and packets can be transmitted/received to/from the CN via the target AP. The period from the MN disconnecting from the serving AP to the MN connecting to the target AP again is called handoff latency which introduces packet losses during the handoff procedure. The handoff latency for the handoff based on IEEE 802.1x using EAP-MD5, is the sum of the time required for the scan, authentication, re-association and EAP authentication processes, i.e., $T_{scan}+T_{auth}+T_{asso}+T_{EAP}$.

Figure 3A:
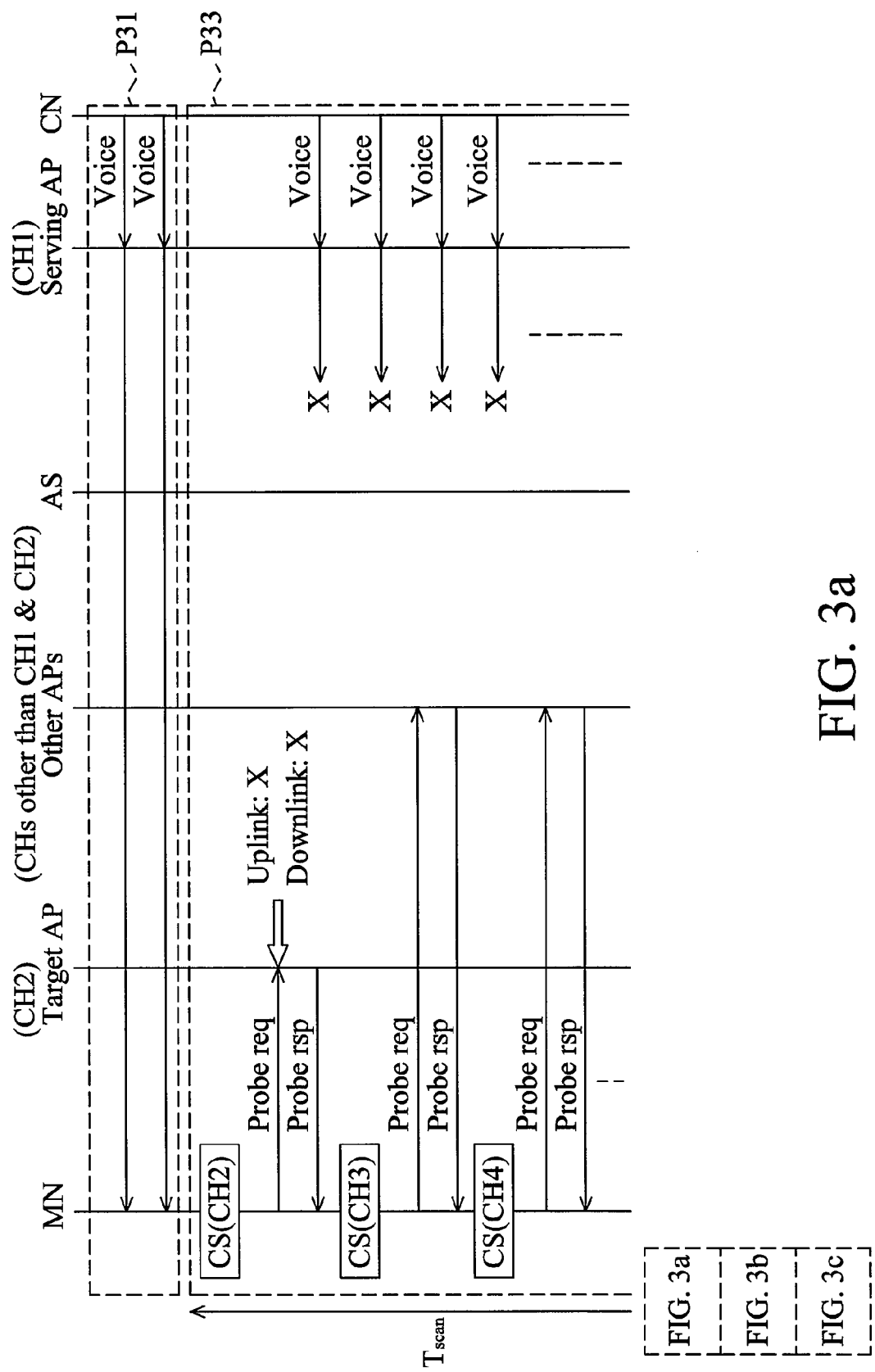
FIG. 3 is a sequence diagram illustrating an exemplary IEEE 802.11i handoff procedure using EAP-TLS (extensible authentication protocol-transport layer security) plus 4-way handshake.
Figure 3B:
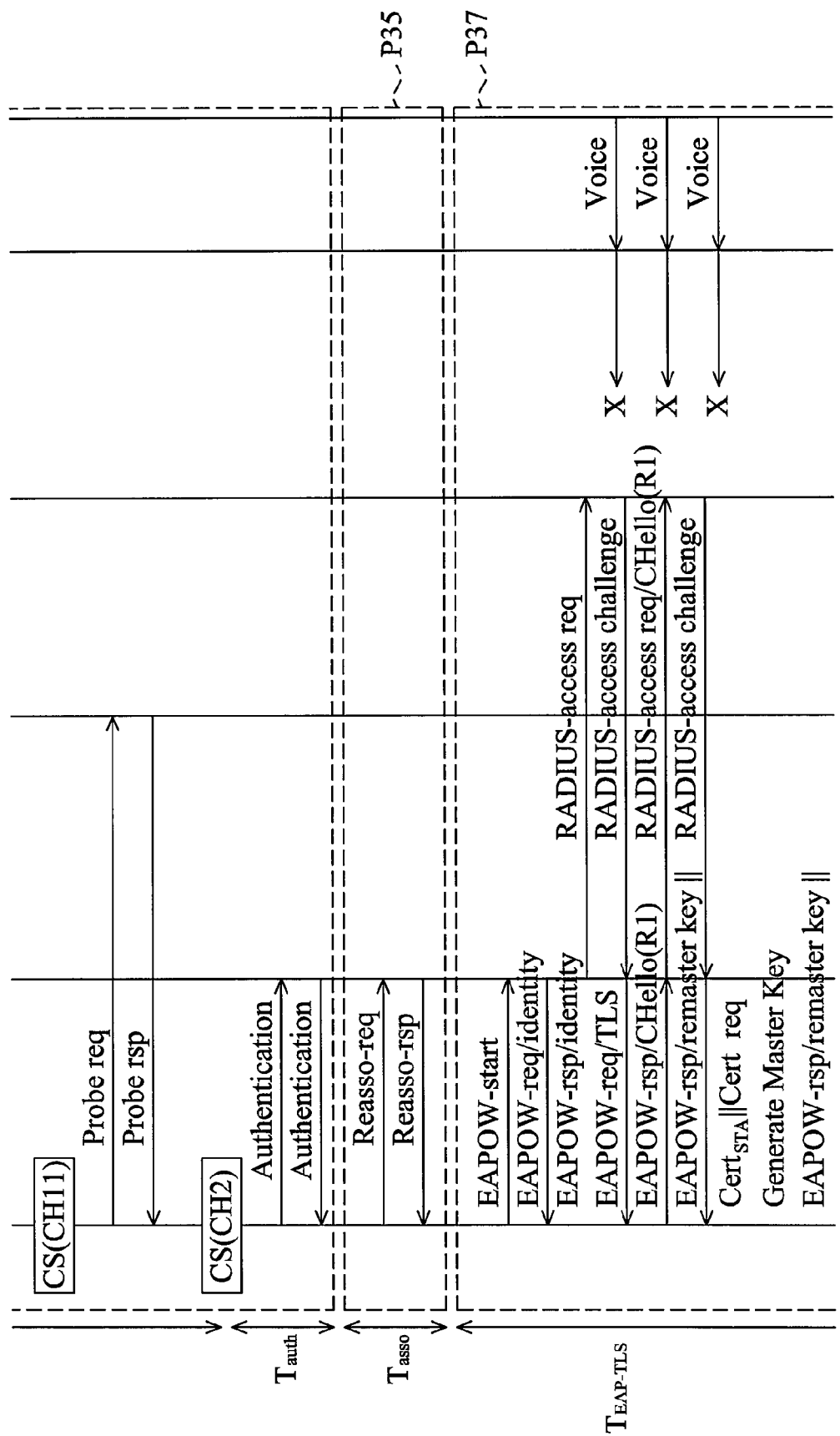
Figure 3C:
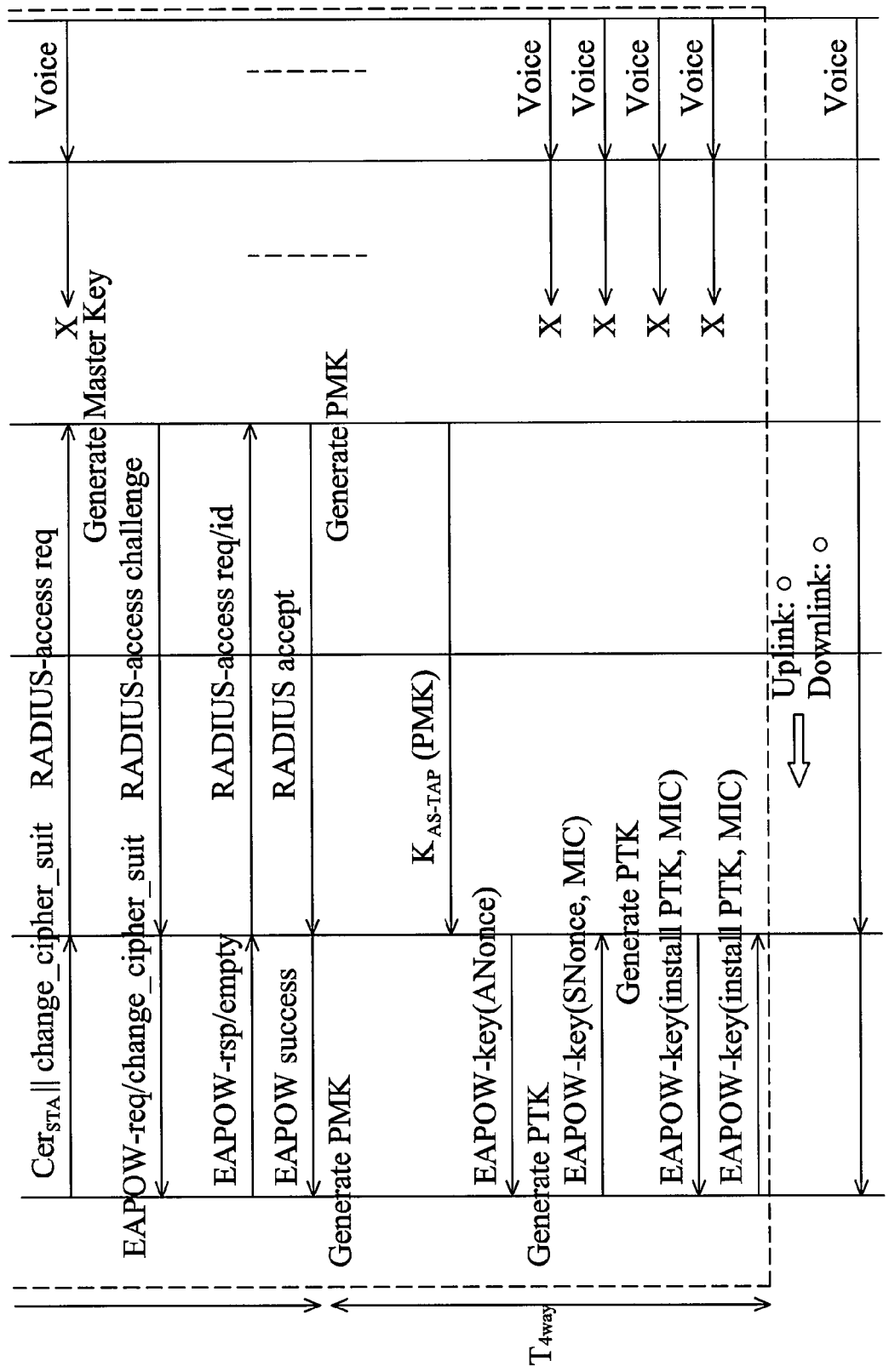

FIG. 3 is a sequence diagram illustrating an exemplary handoff procedure with IEEE 802.1x and IEEE 802.11i enabled and using EAP-TLS (extensible authentication protocol-transport layer security) plus 4-way handshake. This is not prior art for purposes of determining the patentability of the invention and merely shows problems found by the present inventors. The entire sequence may be divided into four stages, including data transfer P31, scan and authentication P33, re-association P35, and EAP authentication plus 4-way handshake P37. The data transfer stage P31, the scan and authentication stage P33, and the re-association stage P35 may be understood by referring to the descriptions of data transfer stage P21, the scan and authentication stage P23, and the re-association stage P25 of FIG. 2. In the EAP authentication with 4-way handshake stage P37, the MN and the AS authenticate each other using EAP-TLS and the AS generates a pairwise master key (PMK). The AS subsequently transmits the generated PMK to the MN and the target AP in a secure way. Thereafter, the MN performs a 4-way handshake with the target AP to generate a pairwise transient key (PTK) from the PMK. The PTK changes periodically and is employed to encrypt and decrypt WLAN link-layer frames. Specifically, the PTK is asset of keying materials containing the cryptographic keys for secure handshake and data transmissions, including the temporal key (TK), EAPOL-key confirmation key (KCK), and EAPoL-key encryption key (KEK). Handshaking messages are encapsulated in the IEEE 802.1x EAPoL-Key format, and are protected against man-in-the-middle attacks. In the 4-way handshake, the target AP start by sending a random nonce, called "ANonce", to the MN. After receiving the message, the MN generates another random nonce, called "SNonce". These two random nonce and shared PMK are then used to produce the PTK. After that, the MN replies by sending message 2 with the SNonce to the target AP, which is protected by MIC (message integrity code). The target AP generates the PTK in the same way as the MN and verifies the MIC. The target AP sends message 3 to notify the MN of the installation of the PTK after successfully verifying the MIC. Finally, the MN replies to the target AP with message 4 to confirm the installation of the PTK. As a result, new keying materials are synchronized and used by both the MN and the target AP. Once the PTK is successfully installed in the EAP authentication plus 4-way handshake stage P37, the handoff is completed and packets can be transmitted/received to/from the CN via the target AP. The handoff latency for the IEEE 802.1x handoff using EAP-TLS plus 4-way handshake is the sum of the time required for the scan, authentication, re-association, EAP authentication and 4-way handshake processes, i.e., $T_{Scan}+T_{auth}+T_{asso}+T_{EAP-TLS}+T_{4way}$.

Figure 4A:
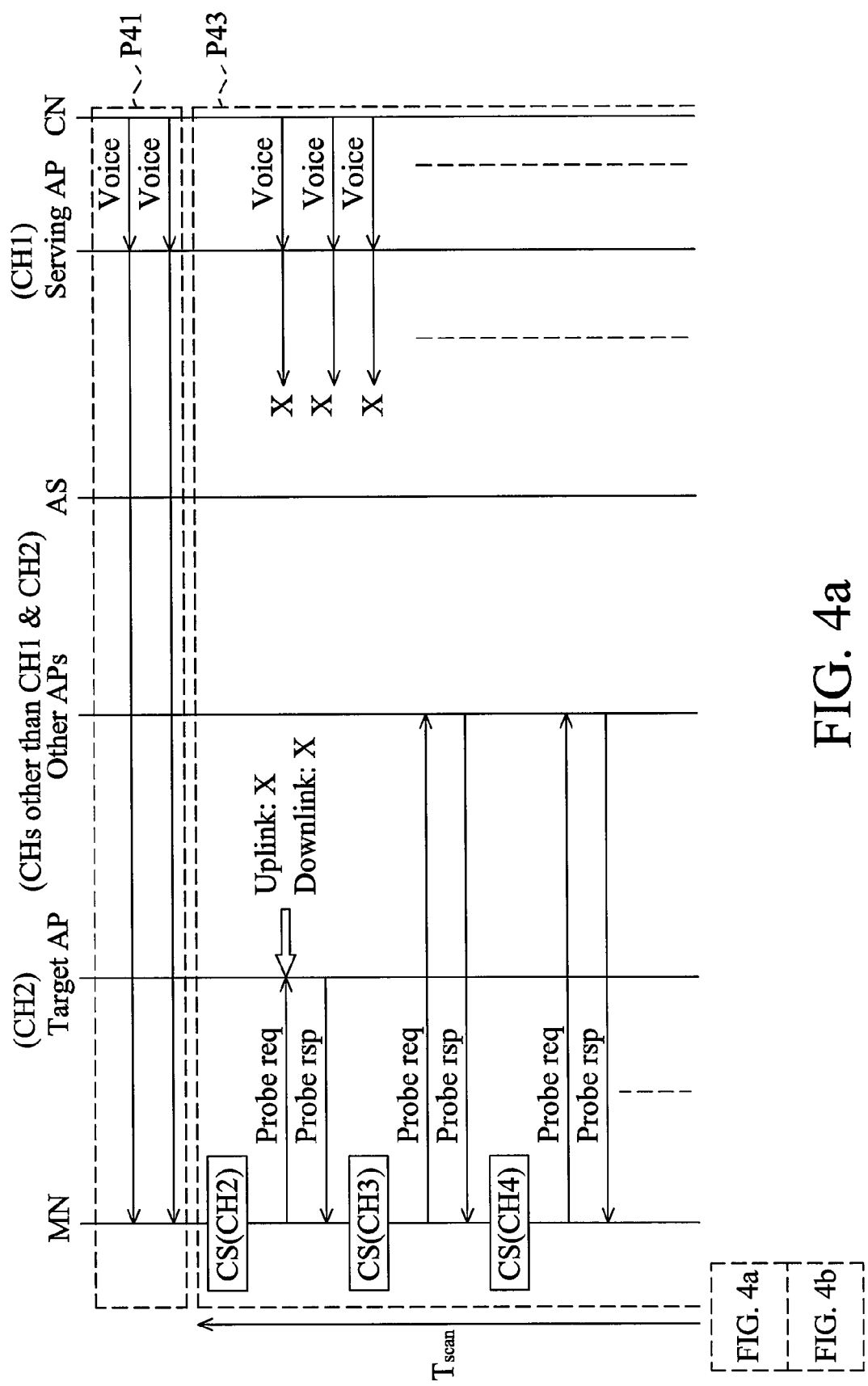
FIG. 4 is a sequence diagram illustrating an exemplary IEEE 802.11f plus IEEE 802.11i handoff procedure.
Figure 4B:
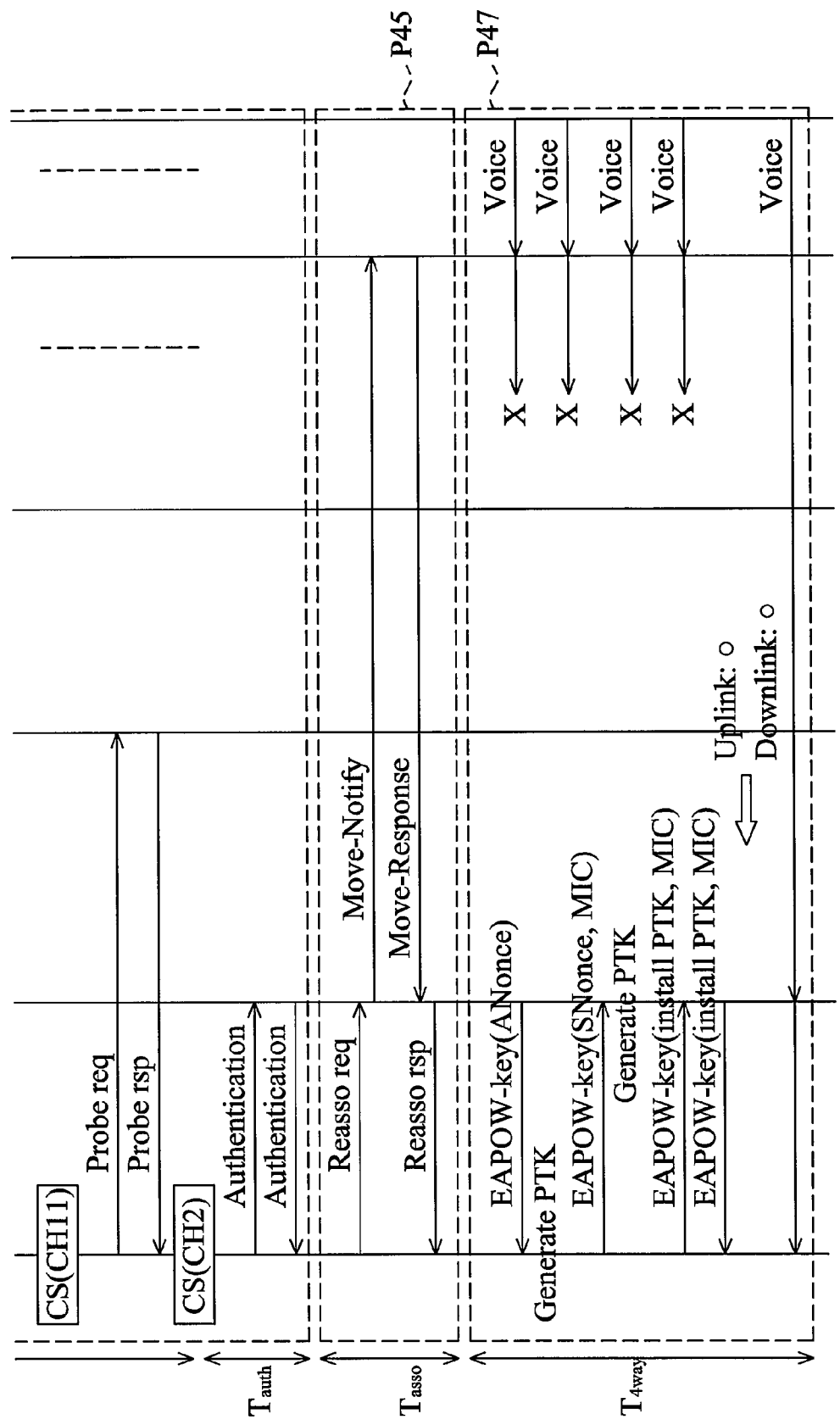

FIG. 4 is a sequence diagram illustrating an exemplary handoff procedure with IEEE 802.11f and IEEE 802.11i enabled. This is not prior art for purposes of determining the patentability of the invention and merely shows problems found by the present inventors. The entire sequence may be divided into four stages, including data transfer P41, scan and authentication P43, re-association P45, and 4-way handshake P47. The data transfer stage P41 and the scan and authentication stage P43 may be understood by referring to the descriptions of data transfer stage P21 and the scan and authentication stage P23 of FIG. 2. In the re-association stage P45, after receiving a re-association request, the target AP transmits a data packet comprising a "Move-Notify" message to the serving AP to notify it that the MN prepares to disconnect from the serving AP. Subsequently, the serving AP transmits a data packet comprising a "Move-Response" message to the target AP. The "Move-Response" message further provides a previously acquired PMK, enabling the target AP to continue the subsequent 4-way handshake without further EAP authentication. After the re-association stage P45, the MN and the target AP proceed to the 4-way handshake described earlier with reference to FIG. 3. The handoff latency for the IEEE 802.11f plus IEEE 802.11i handoff is $T_{scan}+T_{auth}+T_{asso}+T_{4way}$.

Figure 5:
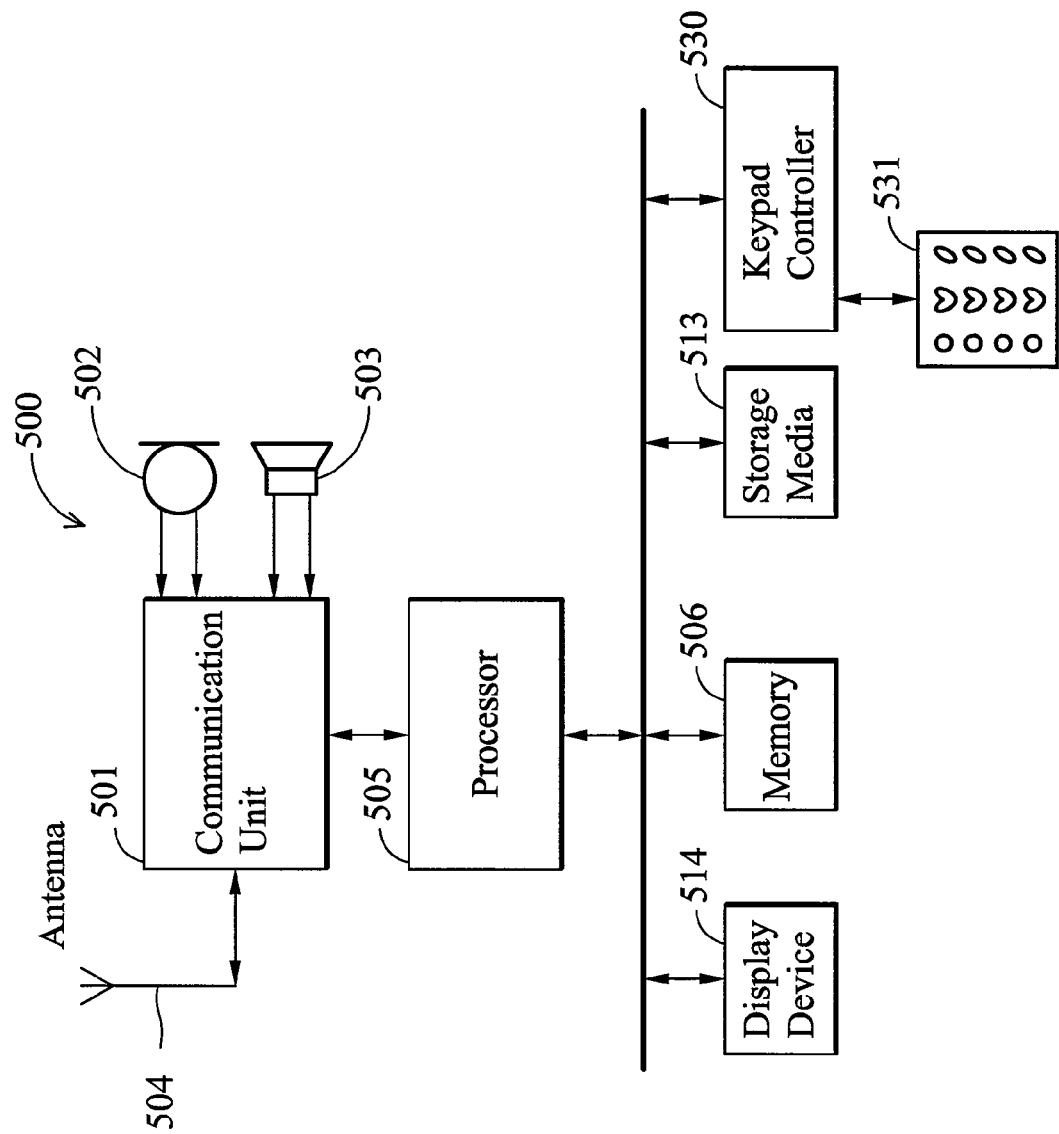
FIG. 5 is a diagram of a hardware environment of an MN in which embodiments of the present invention may be implemented.

FIG. 5 is a schematic diagram of the hardware structure of a mobile node in which handoff methods according to embodiments of the present invention may be implemented. The MN 500 comprises a communication unit 501, a microphone 502, a speaker 503, an antenna 504, a processor 505, memory 506, storage media 513, a display device 514, a keypad controller 530 and a keypad 531. The communication unit 501 communicates with APs via the antenna 504 when connecting to a wireless network, such as a wireless LAN (local area network) or the like. The processor 505 is connected to the communication unit 501, memory 506, storage media 513, display device 514, and keypad controller 530 via various bus architectures.

The conventional MN only configures a single MAC (medium access control) address, and an MAC address can only been associated with one AP in a subnet. After the conventional MN associates or re-associates with a target AP, the target AP uni-casts or broadcasts a "IAPP ADD-notify" or "IAPP MOVE-notify" packet to notify the serving AP that the MN has re-associated or associated with the target AP, forcing the serving AP to automatically de-associate from the MN. Association with the target AP indicates that the target AP had never been associated with the MN. Re-association with the target AP indicates that the target AP had been associated with the MN before.

In embodiments of the present invention, the MN 500 may configure two MAC addresses in a single WLAN interface, and such configuration may be implemented in the MAC firmware, called dual-MAC switching (DMS). The MN 500 uses different MAC addresses to separately communicate with the serving and target APs. Therefore, when these two APs are located in the same subnet, the MN 500 still can switch between serving and target APs with two different MACs and maintain both link-layer and network connections with the two APs simultaneously during a handoff procedure.

Packets such as data, VoIP or other packets are transmitted periodically, with for example 10, ms or 30, ms packet intervals. One packet interval may be used for one packet transmission, and an MN typically spends a short period, called a duty cycle, to transmit or receive one packet, and stays idle before initiation of the next packet communication. Therefore, an MN can experience a period of free time, called a sleep cycle, between two packet exchanges. That is, each packet interval is composed of one duty cycle and one sleep cycle.

Figure 6:
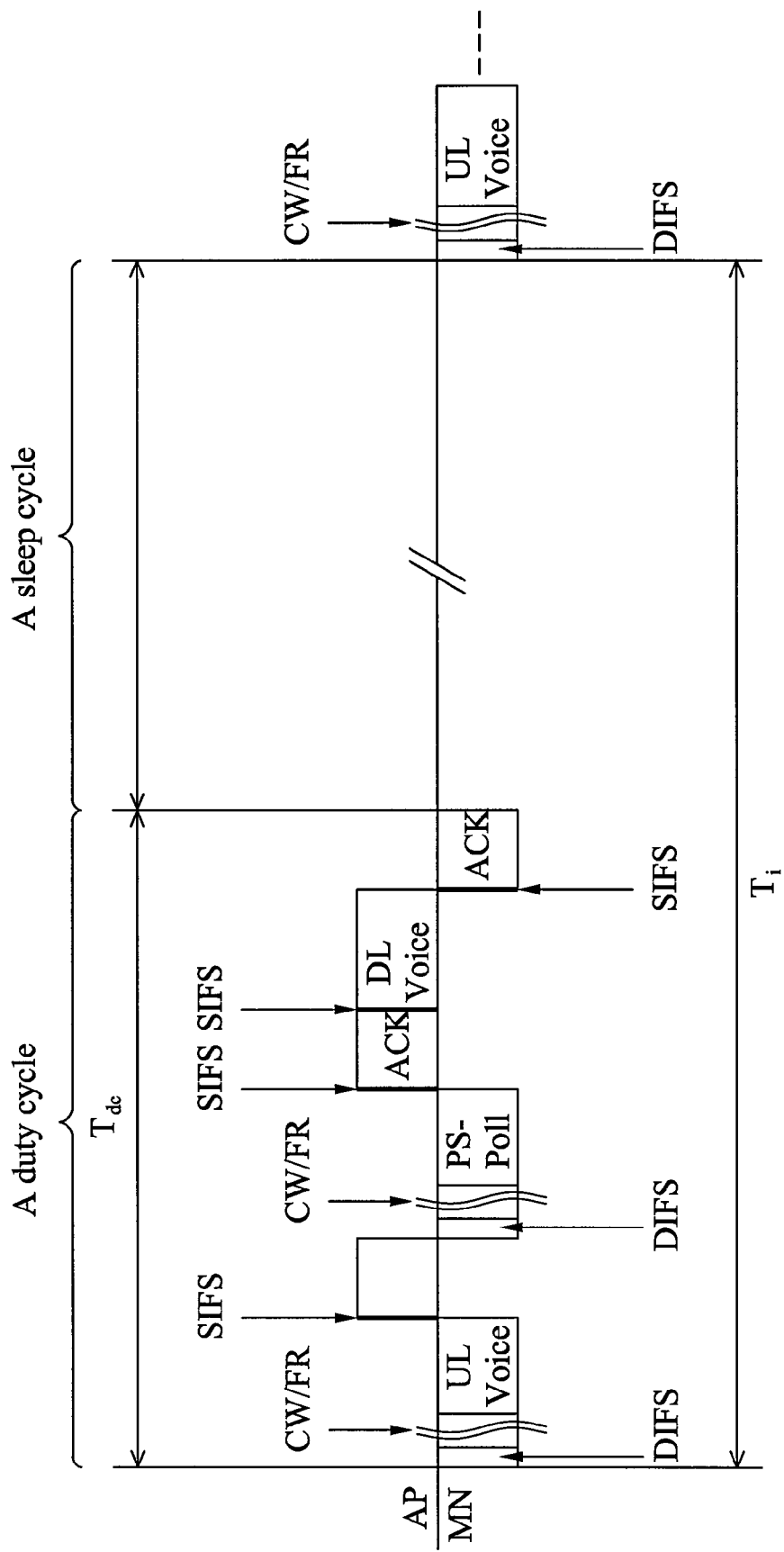
FIG. 6 is a timing diagram for uplink and downlink of voice over IP (VoIP) packet exchanges according to an exemplary PS-Poll transmission scheme.

FIG. 6 is a timing diagram for uplink and downlink of VoIP packet exchanges according to an exemplary PS-Poll transmission scheme described in Chen et. al., "Power Management for VoIP over IEEE 802.11, WLAN," *IEEE Wireless Communication and Networking*, (*WCNC*), March 2004. The PS-Poll transmission scheme adopts the power saving mode (PSM) defined in the IEEE 802.11, standard to transmit and receive packets in WLANs. An MN first notifies the serving AP that it is entering the PSM, and then stays in the WLAN doze state. If the MN has an uplink packet to transmit, it wakes up and sends the packet. After receiving an acknowledgement frame for the uplink packet form the serving AP, comprising information indicating that some data is buffered by the serving AP, the MN sends a PS-Poll frame to retrieve the downlink packet buffered on the serving AP. Finally, the MN receives and acknowledges the downlink packet.

Another transmission scheme is automatic power saving delivery (APSD) defined in the IEEE 802.11e. Still another transmission scheme is described below. Before receiving a buffered downlink packet from the CN, the MN transmits a re-association request comprising a PSM (power saving mode) flag being "false" to the serving AP to notify the serving AP that the MN is awake and ready to receive buffered downlink packets. When the MN enters the PSM, the MN transmits a re-association request comprising a PSM flag being "true".

In any of these three transmission schemes, sleep cycles can be provided between two packet exchange periods. For example, referring to FIG. 7, the uplink and downlink packets are transmitted and received periodically, and the period (the packet interval) is denoted $T_i$. The MN spends the length of a duty cycle, denoted $T_{dc}$, to transmit uplink and receive downlink packets in each period via a channel associated with a serving AP. The MN uses the sleep cycles, denoted $T_i\text{-}T_{dc}$, to switch to one of the other channels and to perform scan, association, re-association, authentication, 4-way handshake or other operations with an AP other than the serving AP, before switching back to the channel associated with the serving AP. This operation is called bounded delay channel switching (BDCS). Specifically, the processor of the MN (e.g. 505 of FIG. 5) spends the length of a duty cycle to transmit uplink and receive downlink packets in each period via the communication unit (e.g. 501 of FIG. 5). The processor uses the sleep cycles to switch to one of the other channels and to perform scan, association, re-association, authentication, 4-way handshake or other operations with an AP other than the serving AP via the communication unit, before switching back to the channel associated with the serving AP.

Contrary to the earlier-described active scan in the scan and authentication stages P23 of FIG. 2, P33 of FIG. 3, and P43 of FIG. 4, in the BDCS method, an MN scans each channel in sleep cycles. Specifically, the processor (e.g. 505 of FIG. 5) scans each channel in sleep cycles via a communication unit (e.g. 501 of FIG. 5).

Figure 7:
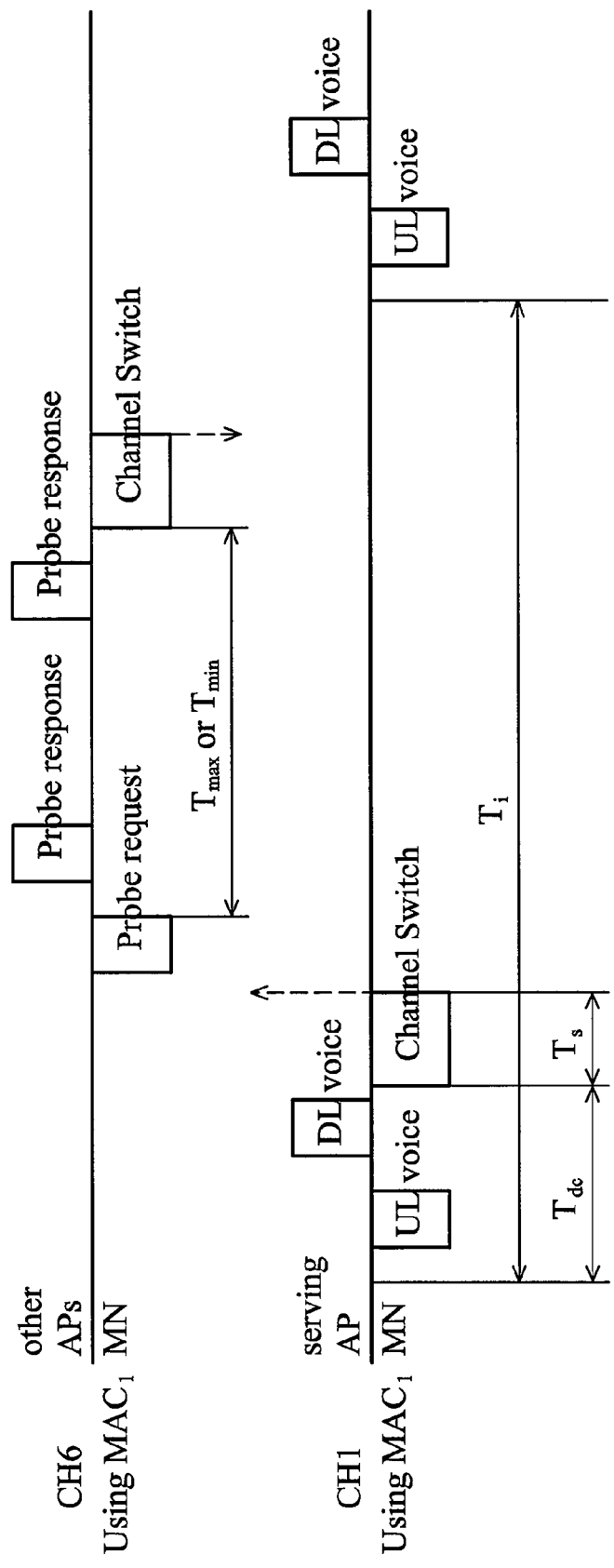
FIG. 7 is a diagram illustrating an active scan according to an embodiment of the present invention.

FIG. 7 is a diagram illustrating an example of an active scan using BDCS. After the MN (e.g. 500 of FIG. 5) completes its uplink and downlink transmission with the serving AP via a first channel, the MN switches to and scans another channel, such as the sixth channel, by sending a probe request and waiting for probe responses from APs in the other channel. After a waiting period, the MN switches back to the first channel to transmit and receive packets with the serving AP again. The period that the MN can stay in another channel is $T_i$-$T_{dc}$-$2\times T_s$, where $T_s$ denotes the channel switching time. Two parameters may be configured, including a maximum probe time $T_{max}$, and a minimum probe time $T_{min}$. The minimum probe time is the minimum waiting time for a probe request without getting any probe response. When the MN receives at least one probe response from active APs within the minimum probe time, the MN waits for the maximum probe time to collect all APs' responses in the same channel. Typically, the length of a sleep cycle is long enough to scan at least one channel, i.e. sending a probe request and receiving at least one probe response when at least one active AP is present in the scanned channel. After scanning relevant channels using sleep cycles, the MN determines the next AP to be associated with (i.e. the target AP) according to the received probe responses. The target AP may be the AP that sent a probe response with the strongest signal strength. Then, the MN performs open authentication with the target AP during sleep cycles. Specially, the processor of the MN (e.g. 505 of FIG. 5) performs open authentication with the target AP via the communication unit (e.g. 501 of FIG. 5) during sleep cycles. The MN may send an authentication request to the target AP, receive an authentication response comprising validation information from the target AP and determine whether the target AP is authenticated by inspecting the validation information.

Contrary to the earlier-described re-association stages P25 of FIG. 2, P35 of FIG. 3, and P45 of FIG. 4, in the BDCS method, an MN sends an association or re-association request informing the target AP that association or re-association with the target AP is initiated, and receives an association or re-association response from the target AP in sleep cycles. Specifically, the processor (e.g. 505 of FIG. 5) sends an association or re-association request informing the target AP that association or re-association with the target AP is initiated, and receives an association or re-association response from the target AP in sleep cycles via the communication unit (e.g. 501 of FIG. 5).

Furthermore, an MN (e.g. 500 of FIG. 5) may use another MAC address, different from the MAC address which has been used to associate the MN with the serving AP, to associate or re-associate with the target AP. In other words, the MN sends an association or re-association request comprising a different MAC address, and as a result, the serving AP will not be forced to de-associate from the MN. Using two different MAC addresses to communicate with the serving and target APs maintains both connections with the two APs simultaneously.

Due to the fluctuation of network traffics and channel condition, after the re-association, the MN may inform the target AP that the MN is entering the power saving mode (PSM). Then, the target AP starts to buffer messages and packets to the MN. Thus, the MN can send request messages in one sleep cycle and retrieve response messages by sending a polling message to the target AP in the subsequent sleep cycles during the described EAP authentication stage (e.g. P27 of FIG. 2), EAP authentication plus 4-way handshake stage (e.g. P37 of FIG. 3) or 4-way handshake stage (e.g. P47 of FIG. 4).

For example, the target AP is informed that the MN has entered PSM after association or re-association with the target AP, and the target AP buffers an EAPOW request message, an EAPOW success message, an EAPOW message with "ANonce", and/or an EAPOW message notification of installation of the PTK during the EAP authentication and/or 4-way handshake. The buffered message is sent to the MN when the target AP receives a polling message from the MN.

Figure 8:
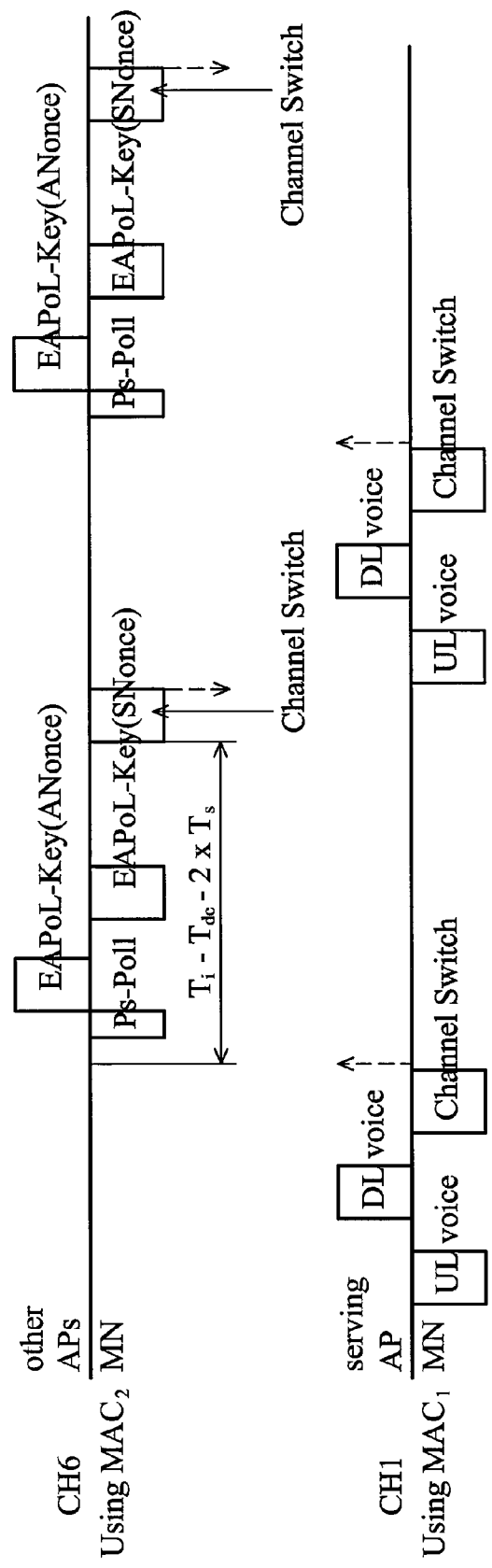
FIG. 8 is a diagram illustrating portions of a 4-way handshake according to an embodiment of the present invention.

FIG. 8 is a diagram illustrating portions of an exemplary 4-way handshake in which an MN (e.g. 500 of FIG. 5) actively retrieves messages from a target AP and performs a 4-way handshake with the target AP using another MAC address. The full IEEE 802.1x authentication and IEEE 802.11i 4-way handshake in sleep cycles using another MAC address may be understood from this example.

Figure 9:
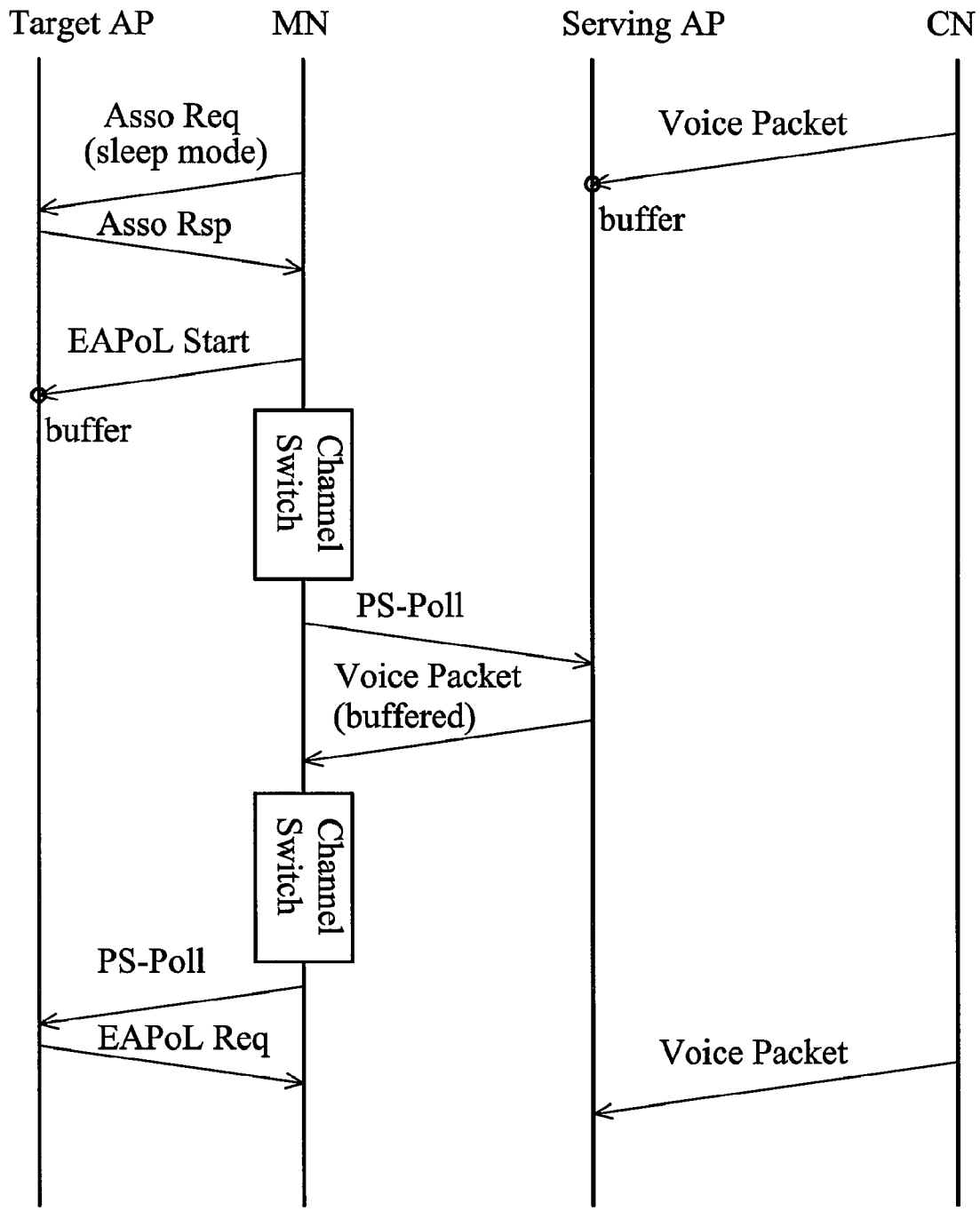
FIG. 9 is a sequence diagram illustrating an example of channel switching in the power saving mode (PSM) according to an embodiment of the present invention.

The MN may also inform a serving AP that the MN is entering the PSM to prevent loss of incoming packets. Then, the serving AP starts to buffer packets to the MN. FIG. 9 is a sequence diagram illustrating an exemplary channel switching in PSM. Before retrieving the buffered VoIP packets, the MN transmits a data packet comprising a "PS-Poll" message (i.e. a polling message) indicating that the MN is ready to receive the buffered packets.

Contrary to the earlier-described EAP authentication stage P27 of FIG. 2, EAP authentication plus 4-way handshake stage P37 of FIG. 3 or 4-way handshake stage P47 of FIG. 4, in the BDCS method, an MN sends an EAPOW start message, an EAPOW response message, an EAPOW message with "SNonce", an EAPOW message notification of installation of the PTK, or combinations of the above, and receives an EAPOW request message, an EAPOW success message, an EAPOW message with "ANonce", an EAPOW message notification of installation of the PTK from the target AP, or combinations of the above, in sleep cycles. Specifically, the processor (e.g. 505 of FIG. 5) sends an EAPOW start message, an EAPOW response message, an EAPOW message with "SNonce", an EAPOW message notification of installation of the PTK or combinations of the above, and receives an EAPOW request message, an EAPOW success message, an EAPOW message with "ANonce", an EAPOW message notification of installation of the PTK from the target AP, or combinations of the above, in sleep cycles via the communication unit (e.g. 501 of FIG. 5).

By employing dual-MAC switching (DMS) embodiment of the present invention, the original connection is maintained after associating or re-associating with the target AP. Furthermore, using the bounded delay channel switching (BDCS) embodiment of the present invention, the MN can receive downlink packets from the CN and transmit uplink packets via the original channel using a first MAC address in duty cycles, and mutually authenticate the MN and the target AP using a second MAC address in sleep cycles. It is to be understood that a switch or a router (which is responsible for transferring packets from the CN to the serving AP or the target AP) stores an MAC address to IP address mapping table originally comprising information indicating that an IP address owned by the MN has mapped to the first MAC address, enabling the switch or router to discover the first MAC address and transfer downlink packets to the MN via the serving AP governing the first MAC address. After the described EAP authentication stage (e.g. P27 of FIG. 2), EAP authentication plus 4-way handshake stage (e.g. P37 of FIG. 3), or 4-way handshake stage (e.g. P47 of FIG. 4), the MN either transmits an ARP (address resolution protocol) request message or the first out-going packet to update the MAC address to IP address mapping table indicating that an IP address owned by the MN has mapped to the second MAC address. Specifically, the processor (505 of FIG. 5) either transmits an ARP request message or the first out-going packet via a communication unit (e.g. 501 of FIG. 5). After that, the switch or router can discover the second MAC address by inspecting the updated MAC address to IP address mapping table and transfer downlink packets from the CN to the target AP governing the second MAC address. Thus, after the ARP update, packets can be delivered to the MN via the target AP. It is to be understood that, if the MAC address to IP address mapping table is not updated after mutually authenticating the MN and the target AP, the switch or router still transfers packets from the CN to the serving AP, resulting in unexpected packet loss.

Figure 10A:
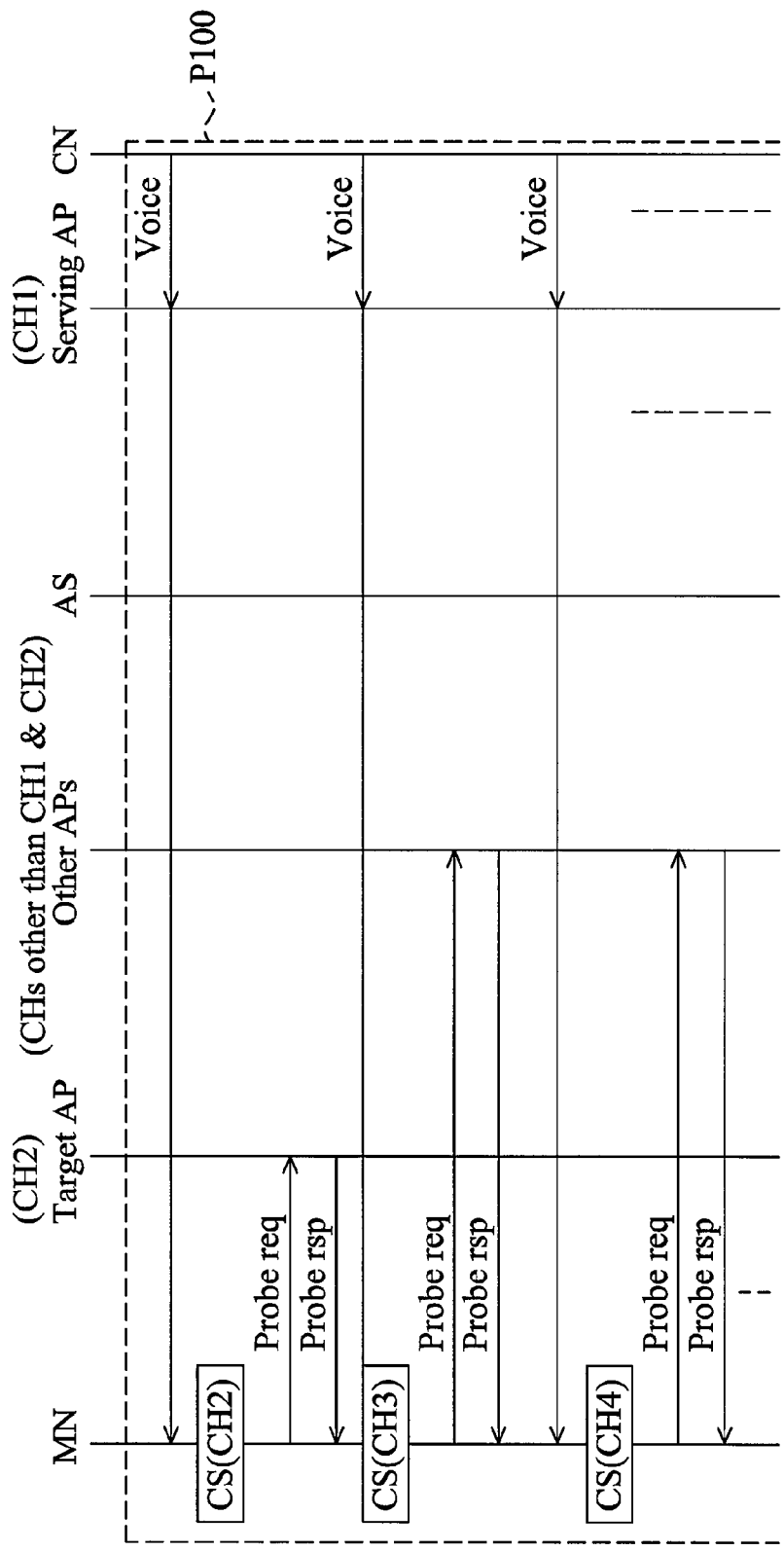
FIG. 10 is an exemplary IEEE 802.1x handoff procedure using EAP-MD5, when employing bounded delay channel switching (BDCS) according to an embodiment of the present invention.
Figure 10B:
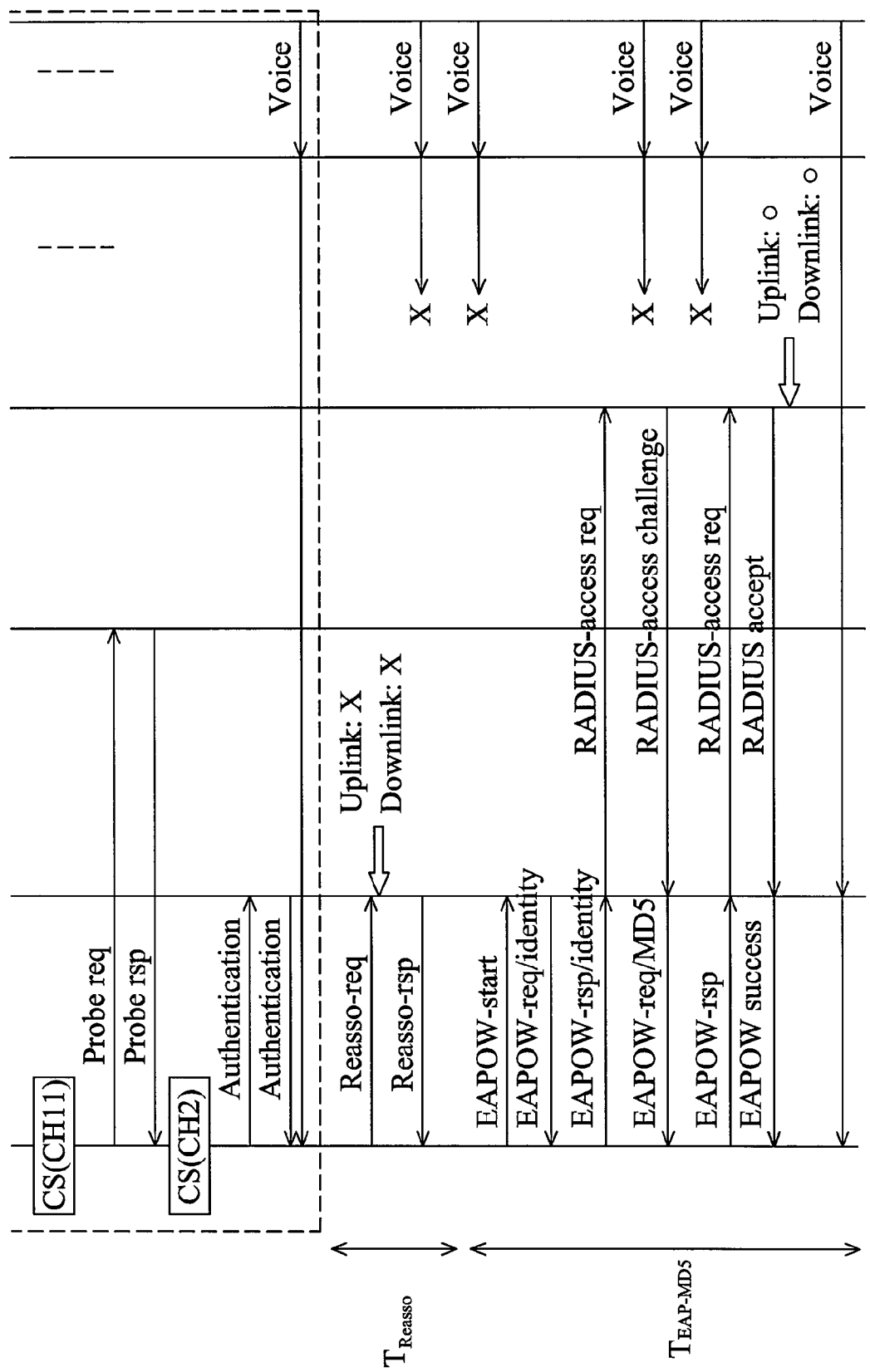

FIG. 10 is an exemplary handoff procedure with IEEE 802.1x enabled and using EAP-MD5, when employing BDCS. During a scan and authentication stage P100, the MN transmits/receives packets such as data, VoIP or other packets, to/from a CN in the described duty cycles, and discovers and authenticates a target AP in the described sleep cycles. Specifically, in channel scan, the MN switches from a first channel associated with the serving AP to one of the other channels in one sleep cycle to discover whether an AP is present in that channel, and then switches from the other channel to the first channel to transmit/receive packets to/from the CN in one duty cycle. After completing packet transmission/receiving, the MN switches from the first channel to another one of the other channels in the next sleep cycle to discover whether an AP is present in that channel. The sequences can be understood by those skilled in the art and further details are not presented here. As the MN only configures a single MAC address, after the MN sends an association or re-association request to the target AP, the target AP uni-casts or broadcasts a "IAPP ADD-notify" or "IAPP MOVE-notify" packet to notify the serving AP that the configured MAC address of the MN has re-associated or associated with the target AP, forcing the serving AP to automatically de-associate from the MN. Therefore, packets from the CN cannot be delivered to the MN via the serving AP, resulting in packet delay or loss. Also, packets from the CN cannot be delivered to the MN via the target AP until the MN and the target AP are mutually authenticated. Once the EAP authentication is completed, packets can be transmitted/received to/from the CN via the target AP. The handoff latency of uplink packets for the IEEE 802.1x handoff using EAP-MD5, when employing BDCS is $T_{Reasso}+T_{EAP\_MD5}$. The handoff latency of downlink packets for the IEEE 802.1x handoff using EAP-MD5, when employing BDCS is also $T_{Reasso}+T_{EAP-MD5}$.

Figure 11A:
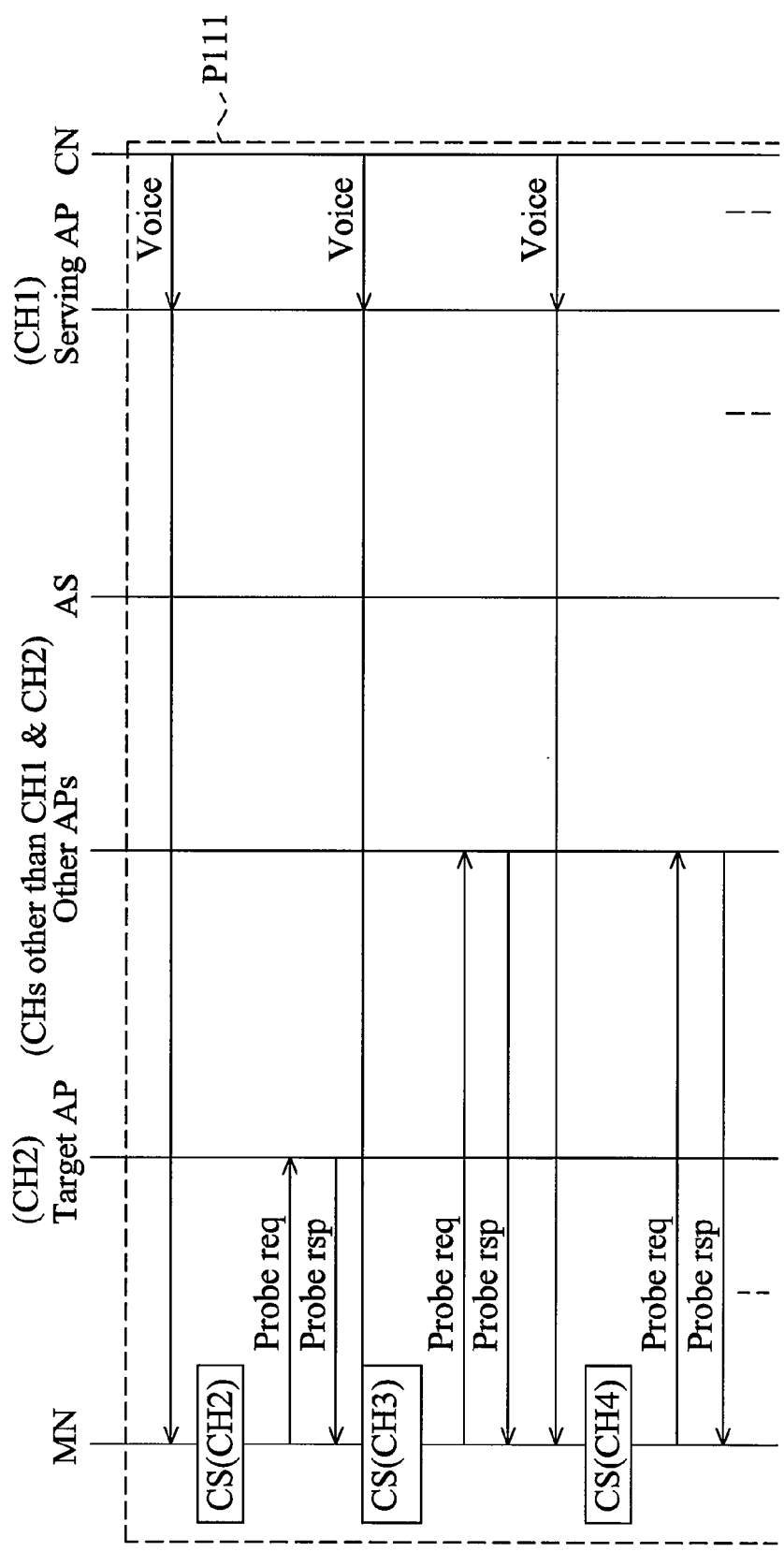
FIG. 11 is an exemplary IEEE 802.1x handoff procedure using EAP-MD5, when employing BDCS and dual-MAC switching (DMS) according to an embodiment of the present invention.
Figure 11B:
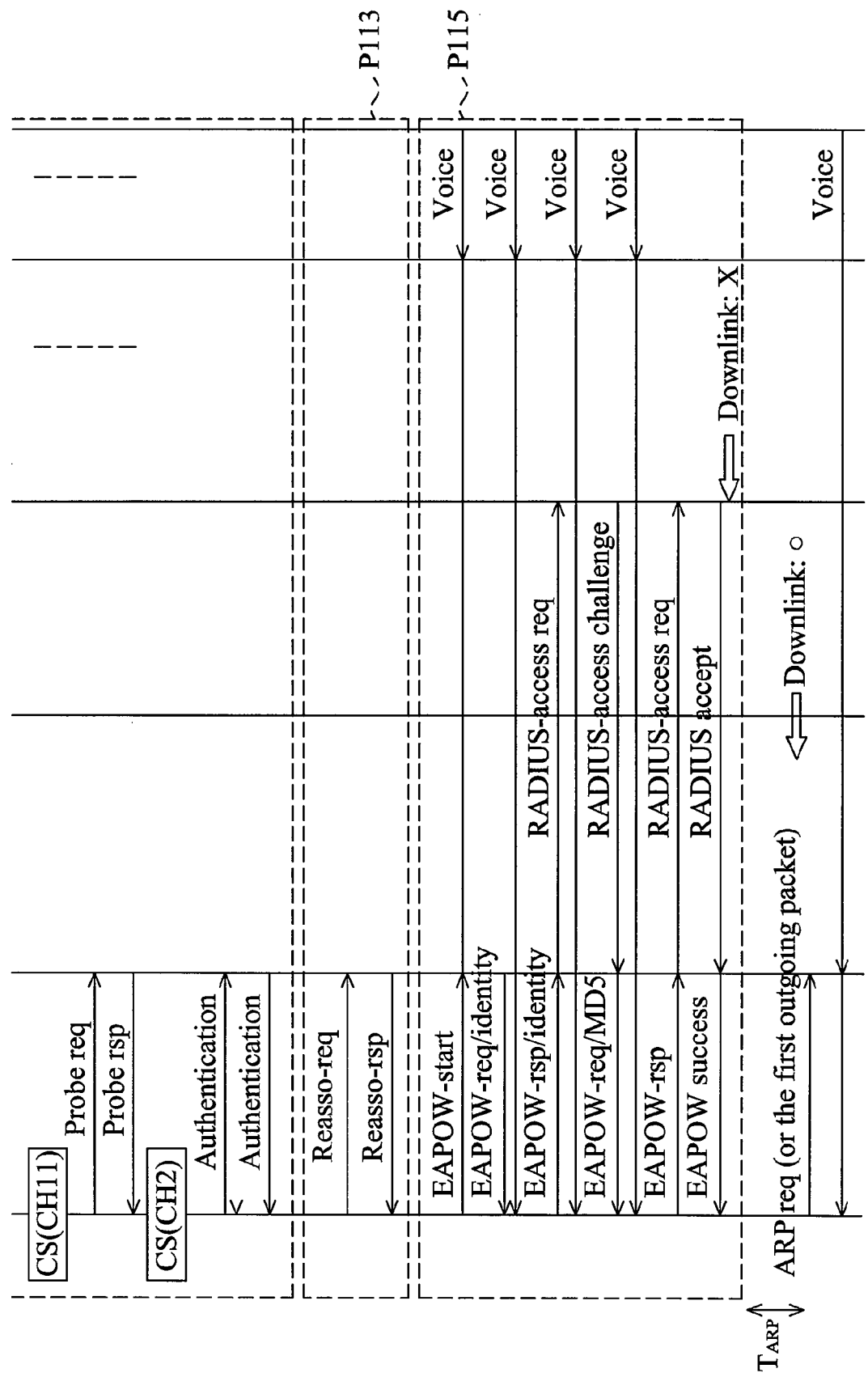

FIG. 11 is an exemplary handoff procedure with IEEE 802.1x enabled and using EAP-MD5, when employing BDCS and DMS. During a scan and authentication stage P111, a re-association stage P113 and an EAP authentication stage P115, packets can be transmitted/received to/from a CN via the serving AP. Once the EAP authentication is completed, packets cannot be received from the CN via the target AP until an MAC address to IP address mapping table resident on a switch or a router is updated by receiving an ARP request message indicating that an IP address owned by the MN has mapped to a new MAC address. The details for updating the MAC address to IP address mapping table are similar to those described earlier. The handoff latency of uplink packets for the IEEE 802.1x handoff using EAP-MD5, when employing BDCS and DMS is zero. The handoff latency of downlink packets for the IEEE 802.1x handoff using EAP-MD5, when employing BDCS and DMS is TARP which is a period for updating the MAC address to IP address mapping table.

Figure 12A:
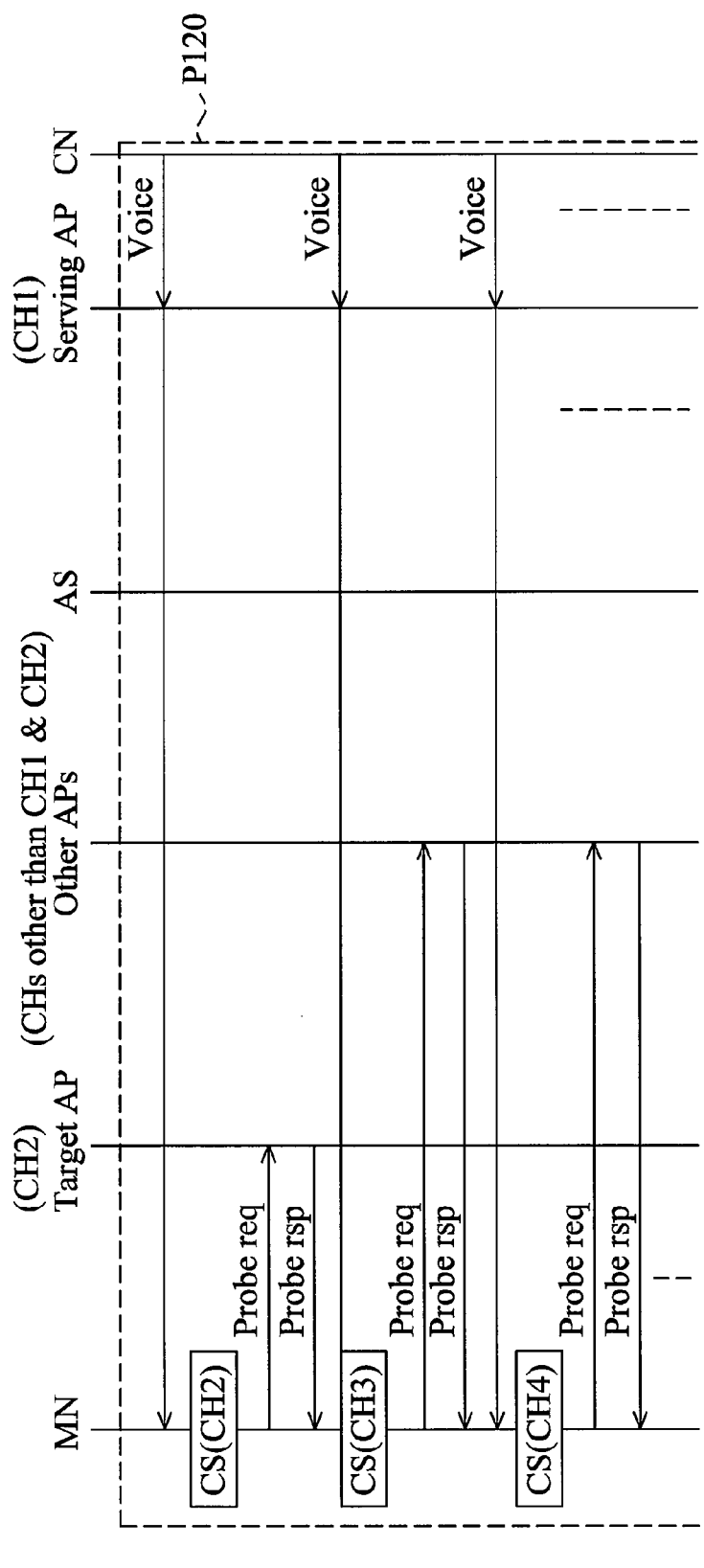
FIG. 12 is an exemplary IEEE 802.11i handoff procedure using EAP-TLS plus 4-way handshake when employing BDCS according to an embodiment of the present invention.
Figure 12B:
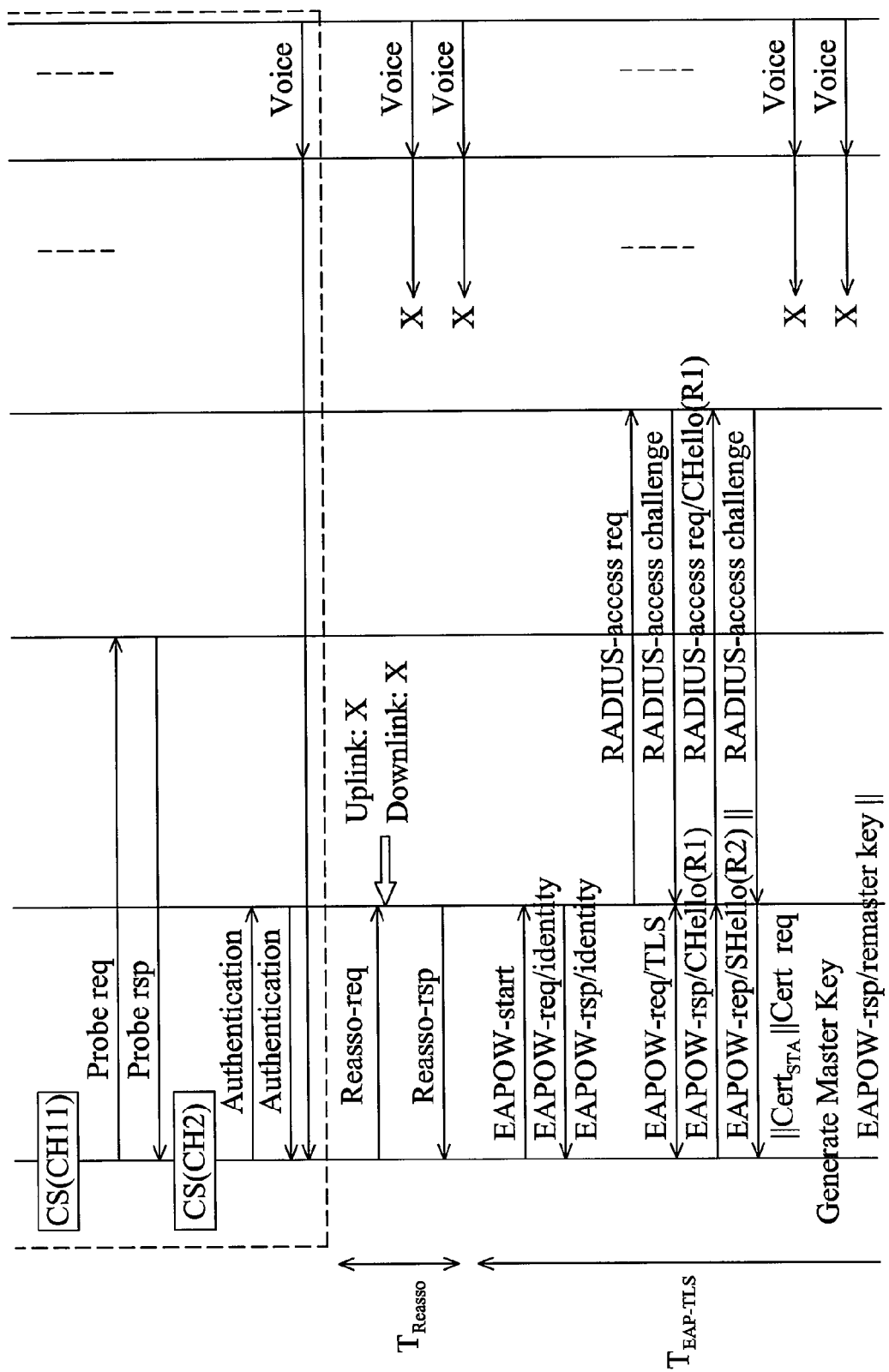
Figure 12C:
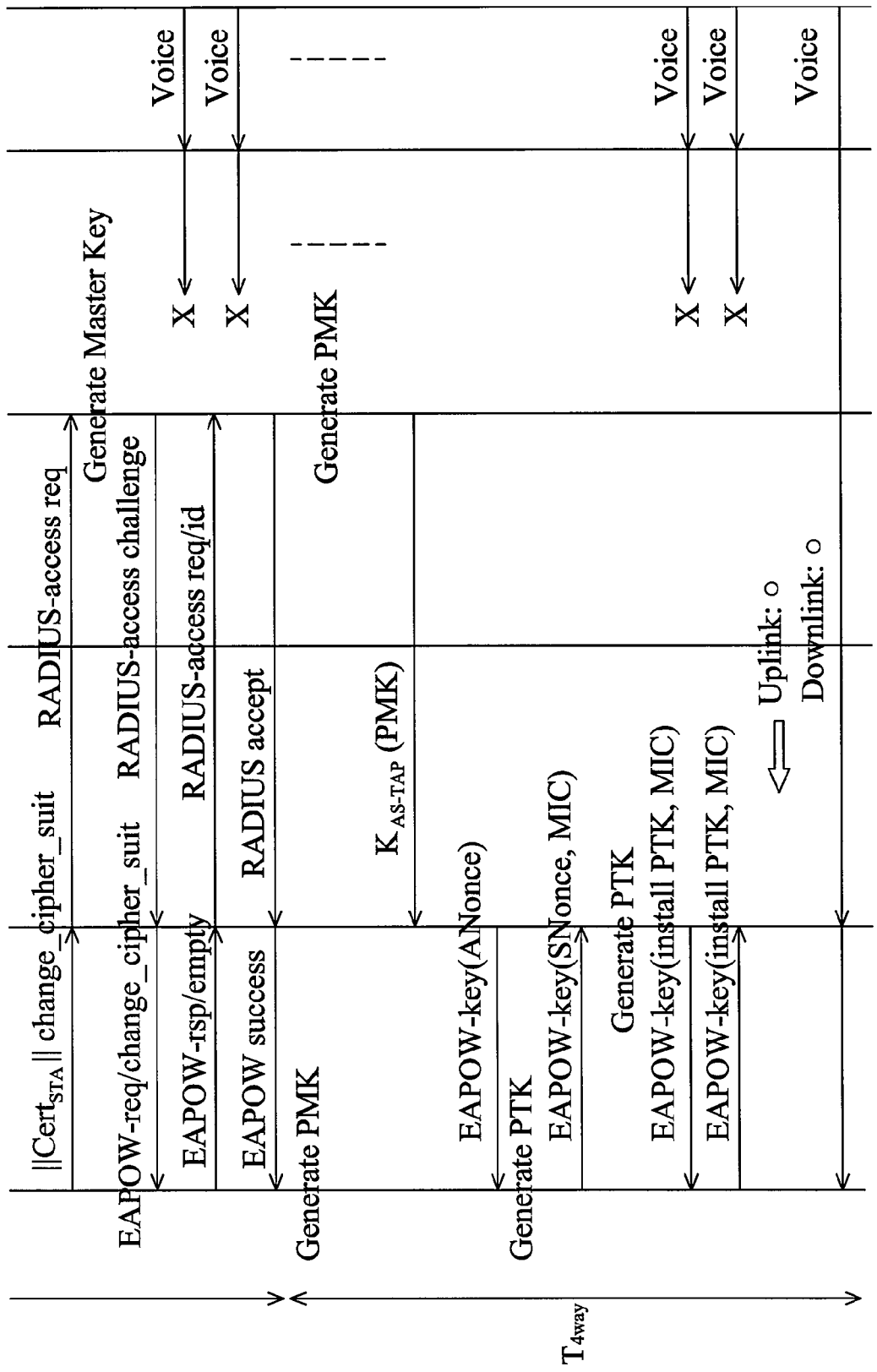

FIG. 12 is an exemplary handoff procedure with IEEE 802.11i enabled and using EAP-TLS plus 4-way handshake when employing BDCS. During a scan and authentication stage P120, the MN transmits/receives packets to/from a CN in the described duty cycles, and discovers and authenticates a target AP in the described sleep cycles. The details of channel scan employing BDCS may be understood by referring to the description of FIG. 10. As the MN only configures a single MAC address, after the MN associates or re-associates with the target AP, the target AP uni-casts or broadcasts a "IAPP ADD-notify" or "IAPP MOV E-notify" packet to notify the serving AP that the MN has re-associated or associated with the target AP, forcing the serving AP to automatically de-associate from the MN. After the PTKs are installed in both the MN and the target AP, packets can be transmitted/received to/from the CN via the target AP. The handoff latency of uplink packets for the IEEE 802.11i handoff procedure using EAP-TLS plus 4-way handshake when employing BDCS is $T_{Reasso}+T_{EAP-TLS}+T_{4-way}$. The handoff latency of downlink packets for the IEEE 802.11i handoff procedure using EAP-TLS plus 4-way handshake when employing BDCS is also $T_{Reasso}+T_{EAP-TLS}+T_{4-way}$.

Figure 13A:
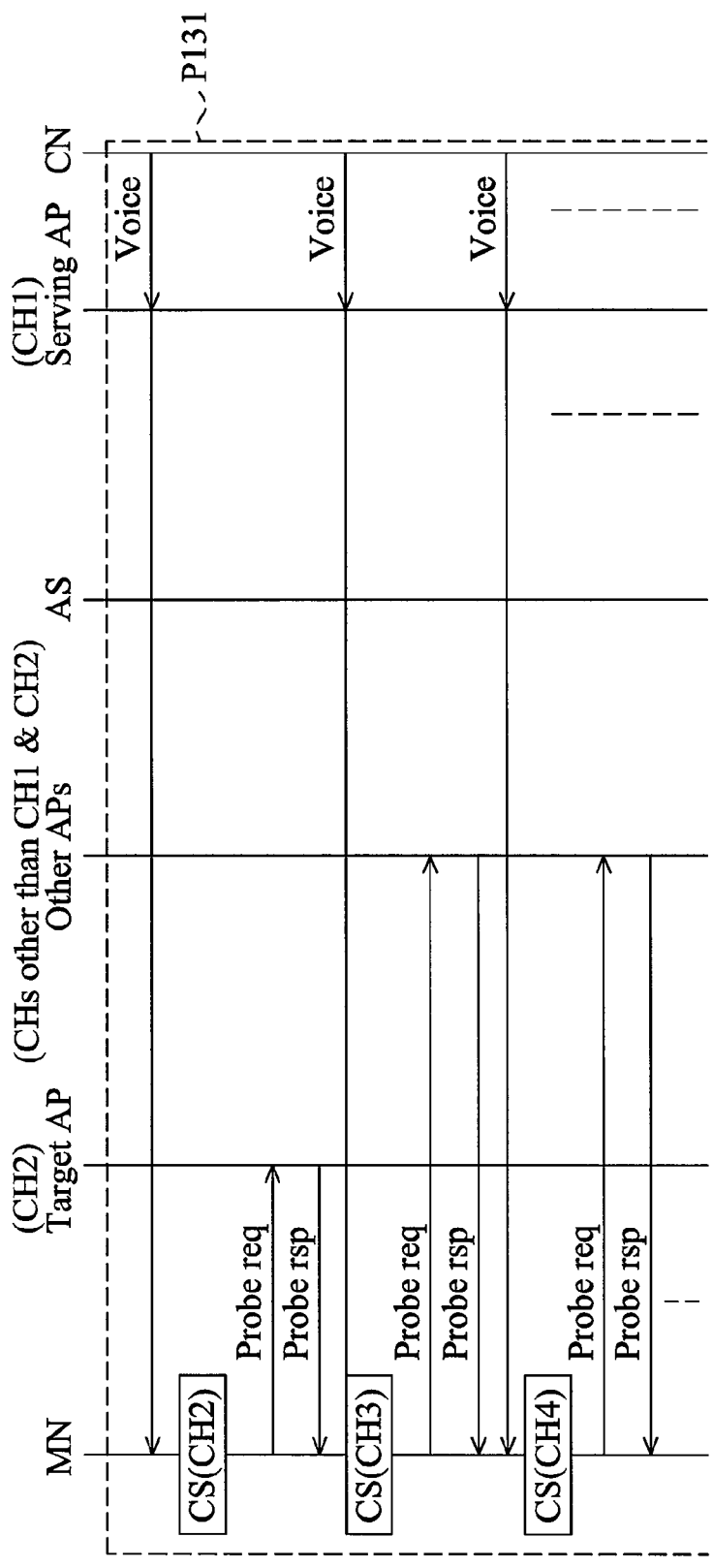
FIG. 13 is an exemplary IEEE 802.11i handoff procedure using EAP-TLS plus 4-way handshake when employing BDCS and DMS according to an embodiment of the present invention.
Figure 13B:
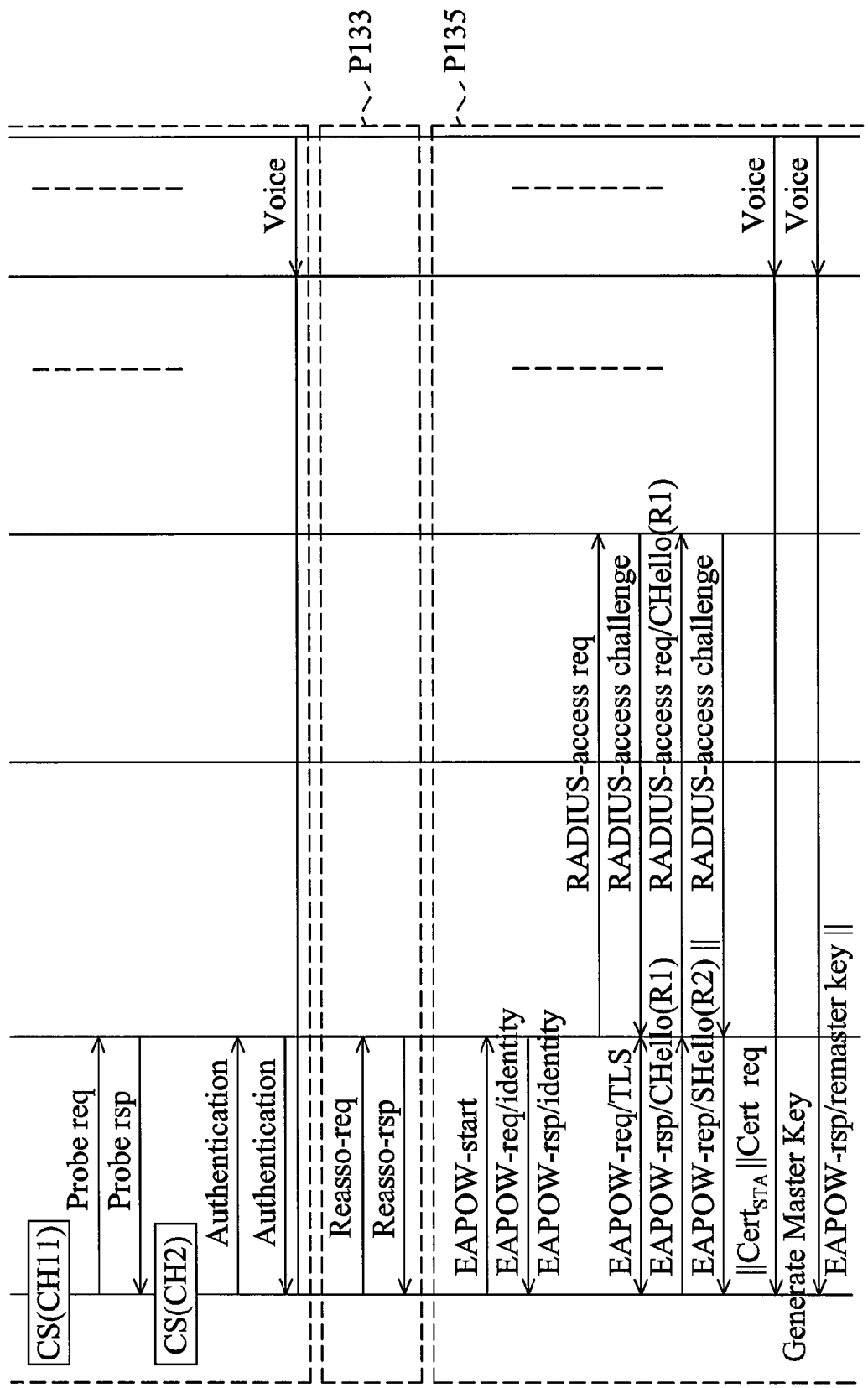
Figure 13C:
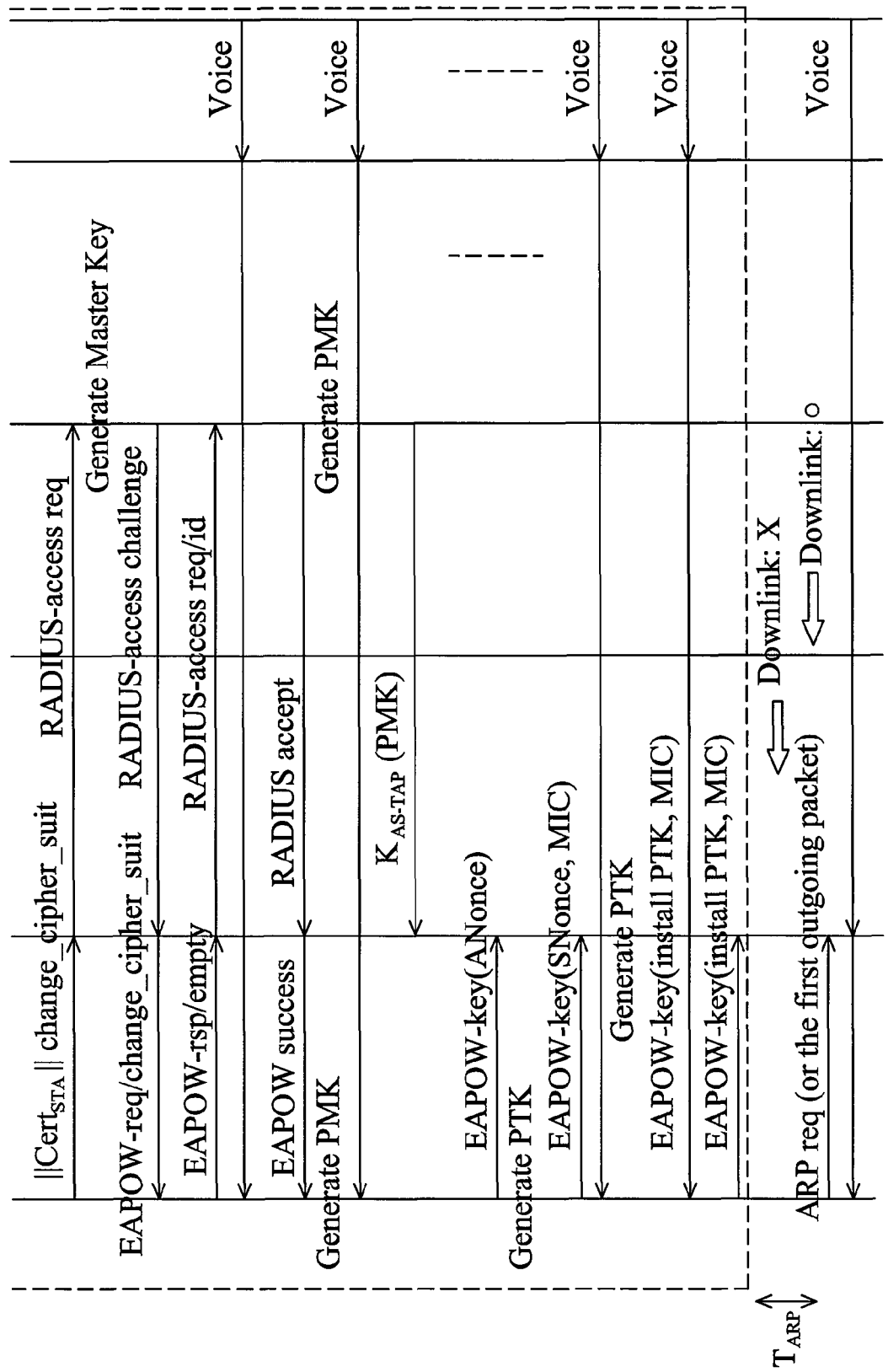

FIG. 13 is an exemplary handoff procedure with IEEE 802.11i enabled and using EAP-TLS plus 4-way handshake when employing BDCS and DMS. During a scan and authentication stage P131, a re-association stage P133 and an EAP authentication plus 4-way handshake stage P135, packets can be transmitted/received to/from a CN via the serving AP. After the PTKs are installed in both the MN and the target AP, packets cannot be received from the CN via the target AP until an MAC address to IP address mapping table resident on a switch or a router is updated by receiving an ARP request message indicating that an IP address owned by the MN has mapped to a new MAC address. The details for updating the MAC address to IP address mapping table are similar to those described earlier. The handoff latency of uplink packets for the IEEE 802.11i handoff procedure using EAP-TLS plus 4-way handshake when employing BDCS and DMS is zero. The handoff latency of downlink packets for the IEEE 802.11i handoff procedure using EAP-TLS plus 4-way handshake when employing BDCS and DMS is $T_{ARP}$.

Figure 14A:
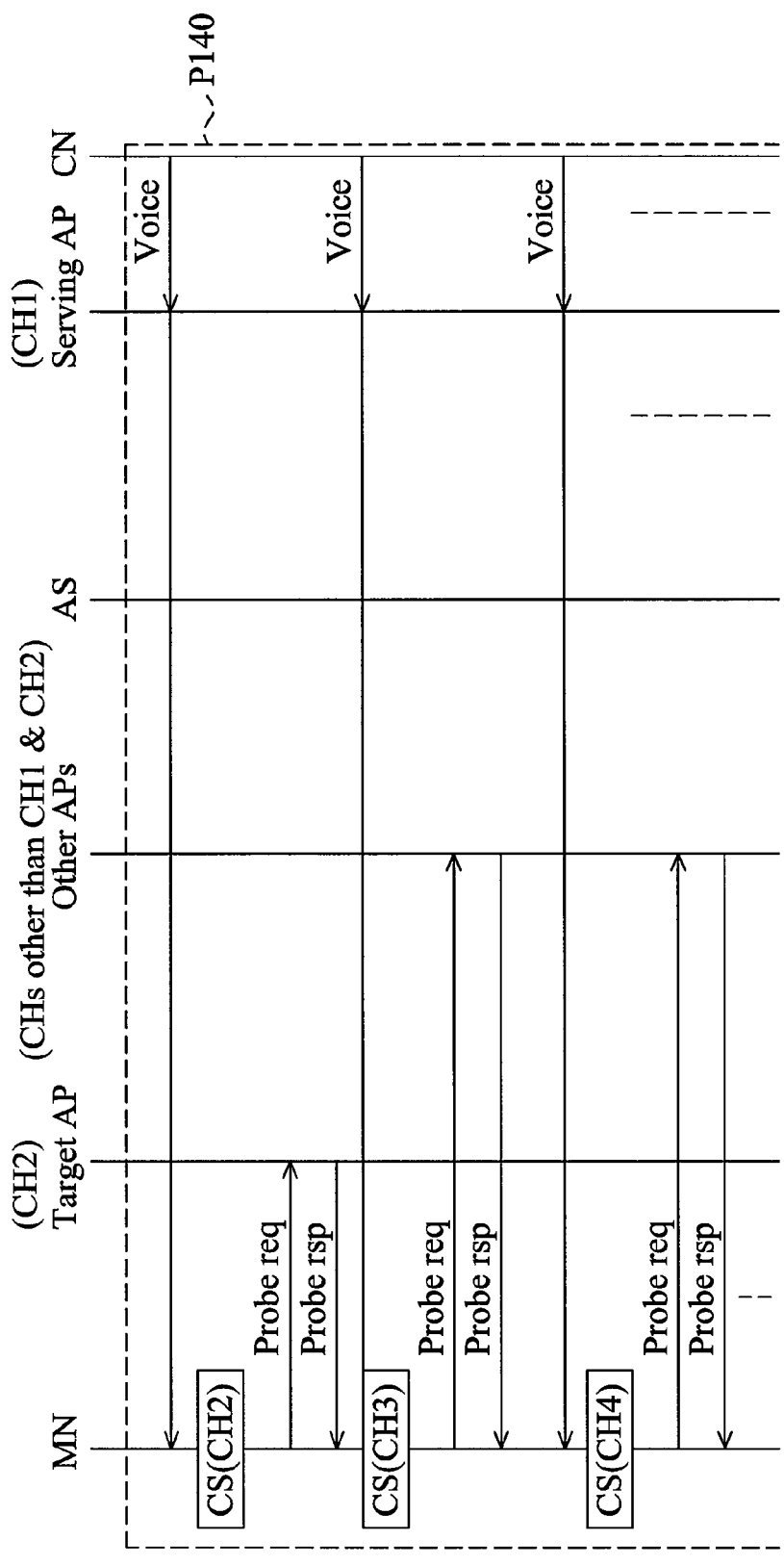
FIG. 14 is an exemplary IEEE 802.11f plus IEEE 802.11i handoff procedure when employing BDCS according to an embodiment of the present invention.
Figure 14B:
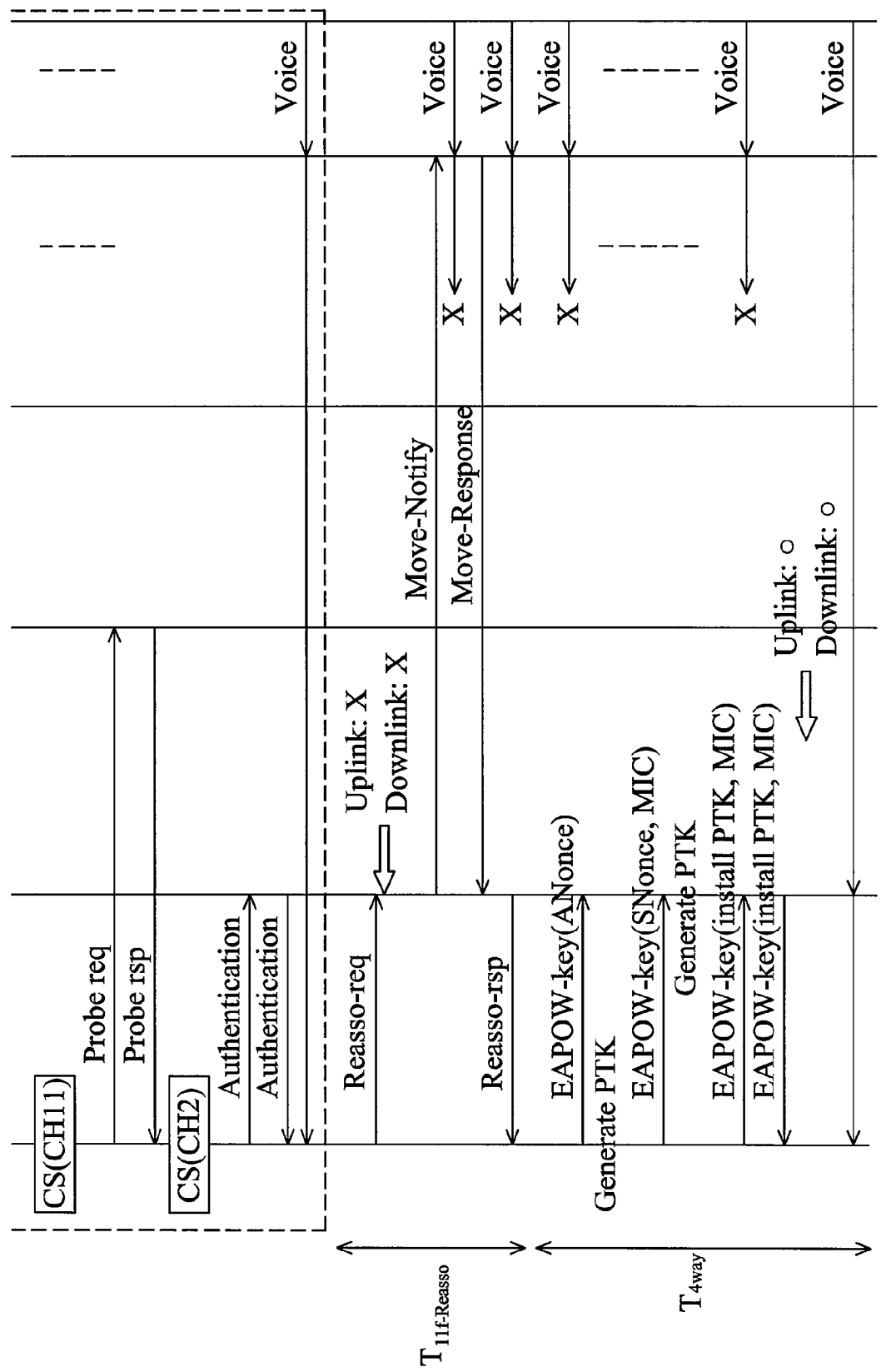

FIG. 14 is an exemplary handoff procedure with both IEEE 802.11f and IEEE 802.11i enabled when employing BDCS. During a scan and authentication stage P140, the MN transmits/receives packets to/from a CN in the duty cycles, and discovers and authenticates a target AP in the sleep cycles. The details of channel scan employing BDCS may be understood by referring to the description of FIG. 10. As the MN only configures a single MAC address, after the MN associates or re-associates with the target AP, the target AP uni-casts or broadcasts a "IAPP ADD-notify" or "IAPP MOVE-notify" packet to notify the serving AP that the MN has re-associated or associated with the target AP, forcing the serving AP to automatically de-associate from the MN. After the PTKs are installed in both the MN and the target AP, packets can be transmitted/received to/from the CN via the target AP. The handoff latency of uplink packets for the handoff procedure with IEEE 802.11f and IEEE 802.11i enabled when employing BDCS is $T_{11f-Reasso}+T_{4-way}$. The handoff latency of downlink packets for the handoff procedure with IEEE 802.11f and IEEE 802.11i enabled when employing BDCS is also $T_{11f-Reasso}+T_{4-way}$.

Figure 15A:
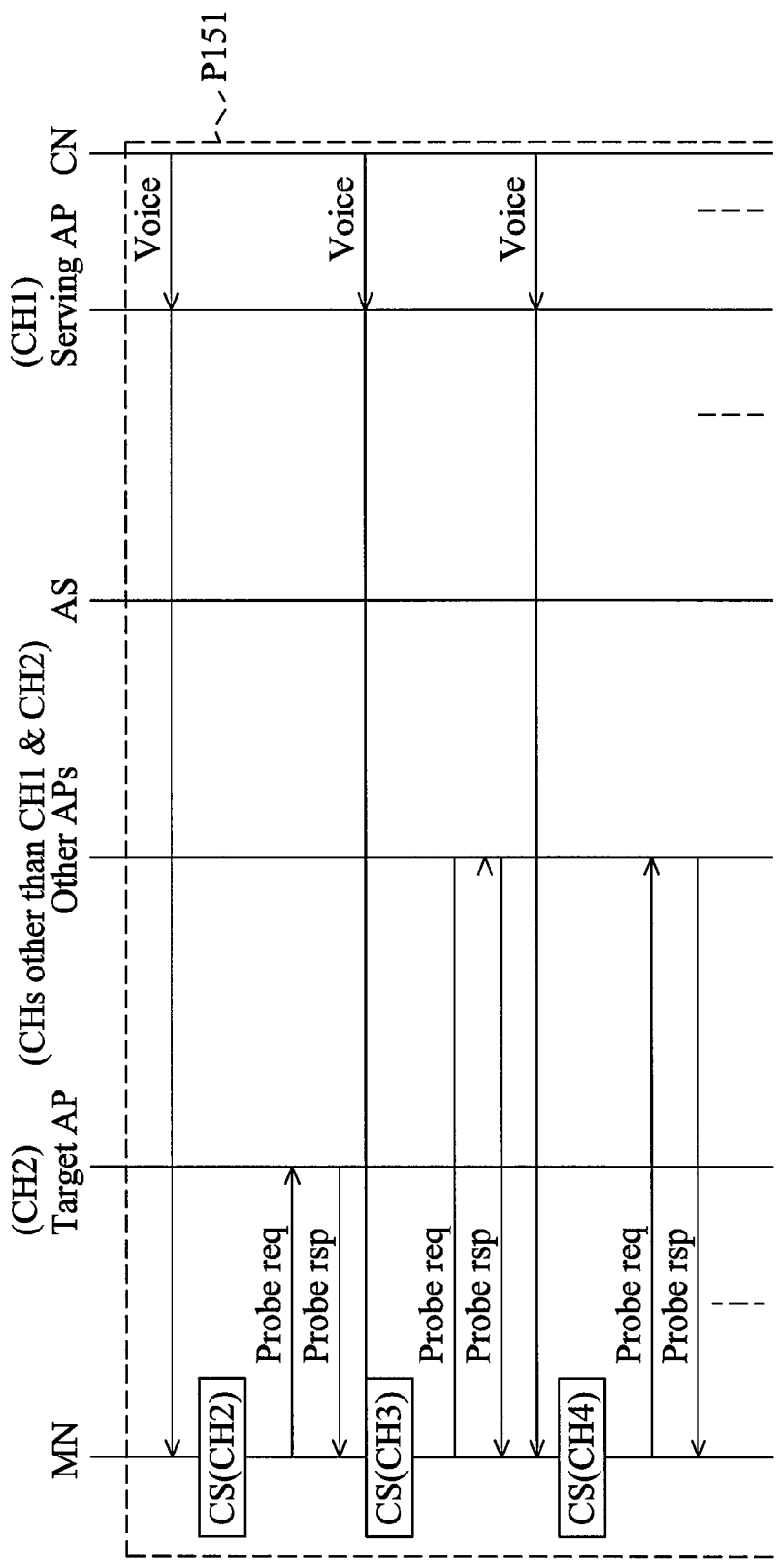
FIG. 15 is an exemplary IEEE 802.11f plus IEEE 802.11i handoff procedure when employing BDCS and DMS according to an embodiment of the present invention.
Figure 15B:
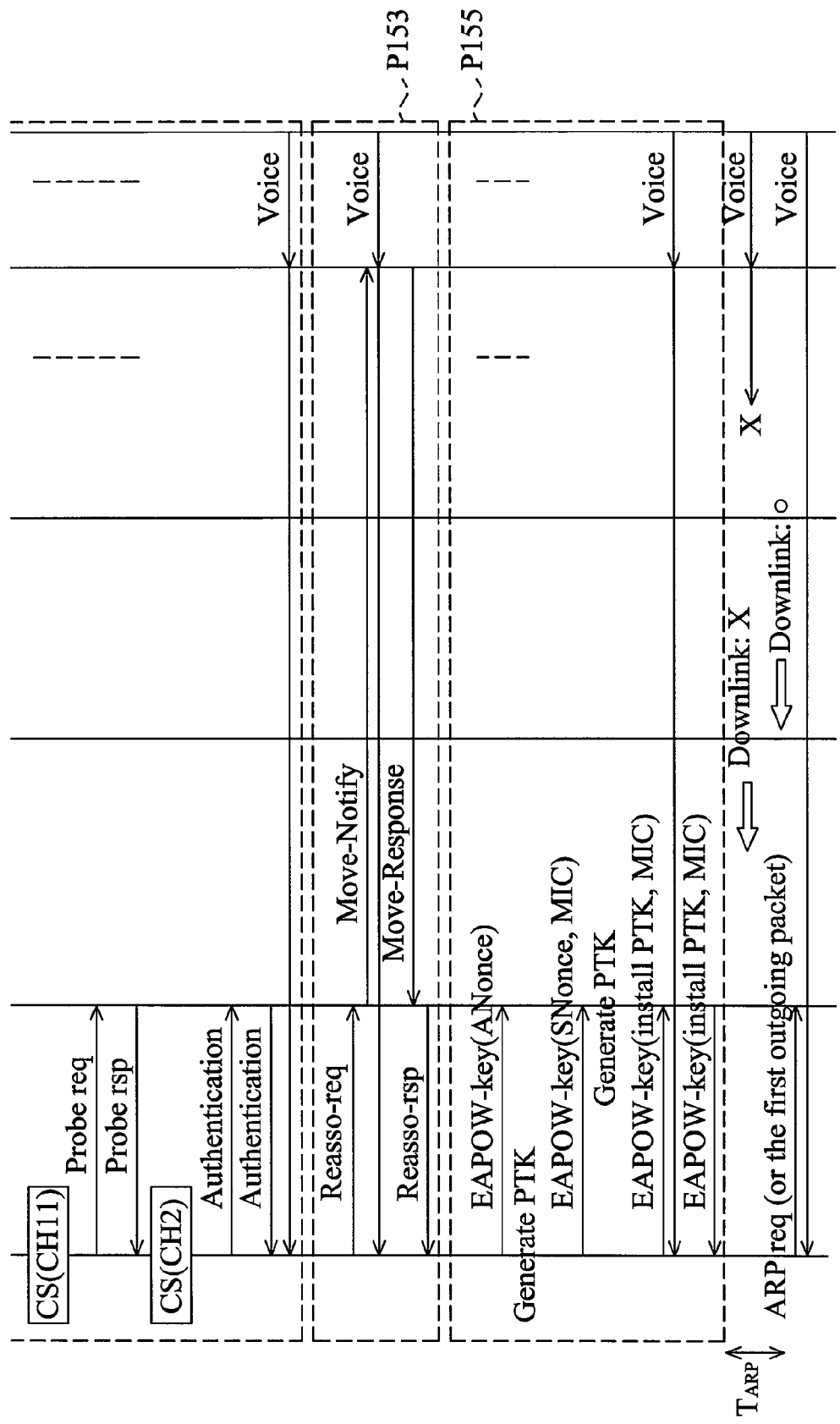

FIG. 15 is an exemplary handoff procedure with IEEE 802.11f and IEEE 802.11i enabled when employing BDCS and DMS. During a scan and authentication stage P151, a re-association stage P153 and a 4-way handshake stage P155, packets can be transmitted/received to/from a CN via the serving AP. After the PTKs are installed in both the MN and the target AP, packets cannot be received from the CN via the target AP until an MAC address to IP address mapping table resident on a switch or a router is updated by receiving an ARP request message indicating that an IP address owned by the MN has mapped to a new MAC address. The details for updating the MAC address to IP address mapping table are similar to those described earlier. The handoff latency of uplink packets for handoff procedure with IEEE 802.11f and IEEE 802.11i enabled when employing BDCS and DMS is zero. The handoff latency of downlink packets for the handoff procedure with IEEE 802.11f and IEEE 802.11i enabled when employing BDCS and DMS is TARP.

Methods for smooth handoff in secured WLANs provided by a mobile node, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a mobile phone, a computer, a DVD recorder or the like, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a mobile phone, a computer or the like, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for handoff in a secured network, performed by a mobile node (MN), comprising:
    (a) periodically switching channels between a first channel and one of a plurality of other channels during handoff;
    (b) utilizing the first channel to transmit/receive a plurality of packets to/from a corresponding node (CN) via a serving access point (AP) which the MN has associated with; and
    (c) utilizing one of the other channels to perform a handoff procedure to a target AP which is to be associated with the MN, comprising:
        informing the target AP that the MN has entered a power save mode (PSM) in one sleep cycle, whereby the target AP buffers an EAPOW (extensible authentication protocol over wireless) request message; and
        sending a polling message to the target AP in a subsequent sleep cycle to retrieve the buffered EAPOW request message,
    wherein the first channel is switched to in a plurality of duty cycles of a plurality of packet intervals, the other channels are switched to in a plurality of sleep cycles of the packet intervals, and the duty cycles and the sleep cycles are interleaved.

2. The method as claimed in claim 1 wherein step (c) comprises:
    (c1) utilizing the other channels to send a plurality of probe requests and receive at least one probe response; and
    (c2) determining the target AP according to signal strength of the received probe response, the target AP being present on a second channel among the plurality of other channels.

3. The method as claimed in claim 2, wherein step (c1) comprises:
    waiting for a minimum probe time after sending the probe request via one of the other channels; and
    when at least one probe response is received within the minimum probe time, waiting for a maximum probe time to collect any additional probe responses in the one of the other channels,
    wherein the maximum probe time is longer than the minimum probe time.

4. The method as claimed in claim 2 wherein step (c) further comprises:
    (c3) utilizing the second channel to send an authentication request to the target AP and receive an authentication response comprising validation information from the target AP; and
    (c4) determining whether the target AP is authenticated by inspecting the validation information.

5. The method as claimed in claim 2 wherein step (c) further comprises:
    (c5) utilizing the second channel to send an association or re-association request to the target AP to inform the target AP that association or re-association with the target AP is initiated and receive an association or re-association response from the target AP.

6. The method as claimed in claim 2 wherein step (c) further comprises:
    utilizing the second channel to send an EAPOW start message, an EAPOW response message, an EAPOW message with "SNonce" or an EAPOW message notification of installation of a PTK (Pairwise transient key), or to receive the EAPOW request message, an EAPOW success message, an EAPOW message with "ANonce" or an EAPOW message notification of installation of a PTK.

7. The method as claimed in claim 1 wherein two MAC (medium access control) addresses are configured in the single network interface of the MAC component, and the MN uses a first MAC address to associate with the serving AP and uses a second MAC address to associate with the target AP.

8. The method as claimed in claim 7 further comprising:
    transmitting an association or re-association request to the target AP using the second MAC address and via a second channel.

9. The method as claimed in claim 7 further comprising:
    transmitting MAC address update information indicating that an IP (Internet protocol) address owned by the MN has mapped to the second MAC address to a switch or router which is responsible for transferring packets from the CN to the serving AP or the target AP after completing the handoff procedure; and
    transmitting/receiving a plurality of packets to/from the CN via the target AP using a second channel.

10. The method as claimed in claim 9 wherein the MAC address update information is contained in an address resolution protocol (ARP) request message.

11. The method as claimed in claim 9 wherein the MAC address update information is contained in a first out-going packet.

12. The method as claimed in claim 9 wherein the handoff procedure is complete upon receiving an EAPOW (extensible authentication protocol over wireless) success message from the target AP.

13. The method as claimed in claim 9 wherein the handoff procedure is complete upon transmitting an EAPOW message notification of installation of a pairwise transient key (PTK) to the target AP.

14. The method as claimed in claim 1 wherein step (c) further comprises:
informing the target AP that the MN has entered the power save mode (PSM) in one sleep cycle, whereby the target AP buffers an EAPOW success message; and
sending a polling message to the target AP in a subsequent sleep cycle to retrieve the buffered EAPOW success message.

15. The method as claimed in claim 1 wherein step (c) further comprises:
informing the target AP that the MN has entered the power save mode (PSM) in one sleep cycle, whereby the target AP buffers an EAPOW message with "ANonce"; and
sending a polling message to the target AP in a subsequent sleep cycle to retrieve the buffered EAPOW message with "ANonce".

16. The method as claimed in claim 1 wherein step (c) further comprises:
informing the target AP that the MN has entered the power save mode (PSM) in one sleep cycle, whereby the target AP buffers an EAPOW message notification of installation of a pairwise transient key (PTK); and
sending a polling message to the target AP in a subsequent sleep cycle to retrieve the buffered EAPOW message notification of installation of a PTK.

17. The method as claimed in claim 1 wherein step (b) further comprises:
informing the serving AP that the MN has entered the power save mode (PSM) in one duty cycle, whereby the serving AP buffers the packets from the CN to the MN; and
sending a polling message to the serving AP in a subsequent duty cycle to retrieve the buffered packets.

18. The method as claimed in claim 1 wherein the secured network complies with one of the IEEE 802.11, IEEE 802.1x and IEEE 802.11i plus IEEE 802.11f standards.

19. A method for handoff in a secured network, performed by a mobile node (MN), comprising:
associating with a serving access point (AP) to transmit/receive a plurality of packets to/from a corresponding node (CN) using a first MAC (medium access control) address; and
performing a handoff procedure to a target AP by employing a second MAC address, comprising informing the target AP that the MN has entered a power save mode (PSM) in one sleep cycle, whereby the target AP buffers a EAPOW (extensible authentication protocol over wireless) success message; and sending a polling message to the target AP in a subsequent sleep cycle to retrieve the buffered EAPOW success message;
whereby once the handoff procedure is completed, the mobile node transmits/receives a plurality of packets to/from the CN via the target AP.

20. The method as claimed in claim 19 further comprising:
periodically switching channels between a first channel and one of a plurality of other channels during handoff;
utilizing the first channel to transmit/receive the plurality of packets to/from the CN via the serving AP, and
utilizing one of the other channels to perform the handoff procedure to the target AP,
wherein the first channel is switched to in a plurality of duty cycles of a plurality of packet intervals, the other channels are switched to in a plurality of sleep cycles of the packet intervals, and the duty cycles and the sleep cycles are interleaved.

21. The method as claimed in claim 19 further comprising:
informing the target AP that the MN has entered the power save mode (PSM) in one sleep cycle, whereby the target AP buffers a EAPOW request message, a EAPOW message with "ANonce" or a EAPOW message notification of installation of a pairwise transient key (PTK); and
sending a polling message to the target AP in a subsequent sleep cycle to retrieve the buffered EAPOW request message, EAPOW message with "ANonce" or EAPOW message notification of installation of the PTK.

22. The method as claimed in claim 19 further comprising:
informing the serving AP that the MN has entered the power save mode (PSM) in one duty cycle, whereby the serving AP buffers the packets from the CN to the MN; and
sending a polling message to the serving AP in a subsequent duty cycle to retrieve the buffered packets.

23. A system for handoff in a secured network, resident on a mobile node (MN), comprising:
a communication unit; and
a processor coupled to the communication unit for periodically directing the communication unit to switch channels between a first channel and one of a plurality of other channels during handoff, for utilizing the first channel to transmit/receive a plurality of packets to/from a corresponding node (CN) via a serving access point (AP) which the MN has associated with, and for utilizing one of the other channels to perform a handoff procedure to a target AP which is to be associated with the MN, comprising informing the target AP that the MN has entered a power save mode (PSM) in one sleep cycle via the communication unit, whereby the target AP buffers an EAPOW (extensible authentication protocol over wireless) success message, and sending a polling message to the target AP in a subsequent sleep cycle via the communication unit to retrieve the buffered EAPOW success message,
wherein the first channel is switched to in a plurality of duty cycles of a plurality of packet intervals, the other channels are switched to in a plurality of sleep cycles of the packet intervals, and the duty cycles and the sleep cycles are interleaved.

24. The system as claimed in claim 23 wherein the processor utilizes the other channels to send a plurality of probe requests and receive at least one probe response, and determines the target AP according to signal strength of the received probe response, the target AP being present on a second channel among the plurality of other channels.

25. The system as claimed in claim 24 wherein the processor waits for a minimum probe time after sending the probe request via one of the other channels, and, when at least one probe response is received within the minimum probe time, waits for a maximum probe time to collect any additional probe responses in the one of the other channels, and wherein the maximum probe time is longer than the minimum probe time.

26. The system as claimed in claim 24 wherein the processor utilizes the second channel to send an authentication request to the target AP and receive an authentication response comprising validation information from the target AP via the communication unit, and determines whether the target AP is authenticated by inspecting the validation information.

27. The system as claimed in claim 24 wherein the processor utilizes the second channel to send an association or re-association request to the target AP via the communication unit to inform the target AP that association or re-association with the target AP is initiated and receive an association or re-association response from the target AP via the communication unit.

28. The system as claimed in claim 24 wherein the processor uses a first MAC (medium access control) address to associate with the serving AP, and uses a second MAC address to associate with the target AP.

29. The system as claimed in claim 28 wherein the processor transmits the second MAC address by an association or re-association request to the target AP via the second channel.

30. The system as claimed in claim 28 wherein the processor transmits MAC address update information indicating that an IP (Internet protocol) address owned by the MN has mapped to the second MAC address to a switch or a router which is responsible for transferring packets from the CN to the serving AP or the target AP after completing the handoff procedure and transmits/receives a plurality of packets to/from the CN via the target AP using the second channel.

31. The system as claimed in claim 30 wherein the MAC address update information is contained in an address resolution protocol (ARP) request message.

32. The system as claimed in claim 30 wherein the MAC address update information is contained in a first out-going packet.

33. The system as claimed in claim 30 wherein the handoff procedure is complete upon receiving the EAPOW success message from the target AP.

34. The system as claimed in claim 30 wherein the handoff procedure is completed upon transmitting an EAPOW message notification of installation of a pairwise transient key (PTK) to the target AP.

35. The system as claimed in claim 24 wherein the processor utilizes the second channel to send an EAPOW start message, an EAPOW (extensible authentication protocol over wireless) response message, an EAPOW message with "SNonce" or an EAPOW message notification of installation of a PTK (Pairwise transient key), or to receive an EAPOW request message, the EAPOW success message, an EAPOW message with "ANonce" or an EAPOW message notification of installation of a PTK.

36. The system as claimed in claim 35 wherein the processor informs the target AP that the MN has entered the power save mode (PSM) in one sleep cycle via the communication unit, whereby the target AP buffers the EAPOW request message, and wherein the processor sends a polling message to the target AP in a subsequent sleep cycle via the communication unit to retrieve the buffered EAPOW request message.

37. The system as claimed in claim 35 wherein the processor informs the target AP that the MN has entered the power save mode (PSM) in one sleep cycle via the communication unit, whereby the target AP buffers the EAPOW message with "ANonce", and wherein the processor sends a polling message to the target AP in a subsequent sleep cycle via the communication unit to retrieve the buffered EAPOW message with "ANonce".

38. The system as claimed in claim 35 wherein the processor informs the target AP that the MN has entered the power save mode (PSM) in one sleep cycle via the communication unit, whereby the target AP buffers the EAPOW message notifying of installation of the PTK, and wherein the processor sends a polling message to the target AP in a subsequent sleep cycle via the communication unit to retrieve the buffered EAPOW message notifying of installation of the PTK.

39. The system as claimed in claim 23 wherein the processor informs the serving AP that the MN has entered the power save mode (PSM) in one duty cycle via the communication unit, whereby the serving AP buffers the packets from the CN to the MN, and wherein the processor sends a polling message to the serving AP to retrieve the buffered packets in a subsequent duty cycles via the communication unit.

40. The system as claimed in claim 23 wherein the secured network complies with one of the IEEE 802.11, IEEE 802.1x and IEEE 802.11i plus IEEE 802.11f standards.

41. A system for handoff in a secured network, resident on a mobile node (MN), comprising:
   a communication unit; and
   a processor coupled to the communication unit for associating with a serving access point (AP) to transmit/receive a plurality of packets to/from a corresponding node (CN) via the communication unit using a first MAC (medium access control) address and for performing a handoff procedure to a target AP by employing a second MAC address, comprising informing the target AP that the MN has entered a power save mode (PSM) in one sleep cycle via the communication unit, whereby the target AP buffers a extensible authentication protocol over wireless (EAPOW) request message, and sending a polling message to the target AP in a subsequent sleep cycle via the communication unit to retrieve the buffered EAPOW request message,
   whereby after the handoff procedure is completed, the mobile node transmits/receives a plurality of packets to/from the CN via the target AP.

42. The system as claimed in claim 41 wherein the processor periodically switches channels between a first channel and one of a plurality of other channels during the handoff procedure, utilizes the first channel to transmit/receive a plurality of packets to/from the CN via the serving AP, and utilizes one of the other channels to perform the handoff procedure to the target AP, wherein the first channel is switched to in a plurality of duty cycles of a plurality of packet intervals, the other channels are switched to in a plurality of sleep cycles of the packet intervals, and the duty cycles and the sleep cycles are interleaved.

43. The system as claimed in claim 41 wherein the processor informs the target AP that the MN has entered the power save mode (PSM) in one sleep cycle via the communication unit, whereby the target AP buffers a EAPOW success message, a EAPOW message with "ANonce" or a EAPOW message notification of installation of a pairwise transient key (PTK), and wherein the processor sends a polling message to the target AP in a subsequent sleep cycle via the communication unit to retrieve the buffered EAPOW success message, EAPOW message with "ANonce" or EAPOW message notification of installation of the PTK.

44. The system as claimed in claim 41 wherein the processor informs the serving AP that the MN has entered the power save mode (PSM) in one duty cycle via the communication unit, whereby the serving AP buffers the packets from the CN to the MN, and wherein the processor sends a polling message to the serving AP in a subsequent duty cycle via the communication unit to retrieve the buffered packets.

* * * * *